US012645990B2

(12) United States Patent
Jana et al.

(10) Patent No.: US 12,645,990 B2
(45) Date of Patent: Jun. 2, 2026

(54) CONTINUAL LEARNING TECHNIQUES FOR TRAINING MODELS

(71) Applicant: Oracle International Corporation, Redwood Shores, CA (US)

(72) Inventors: Sandeep Jana, Bengaluru (IN); Edwin Thomas, Bengaluru (IN); Kulbhushan Pachauri, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 851 days.

(21) Appl. No.: 18/051,419

(22) Filed: Oct. 31, 2022

(65) Prior Publication Data

US 2024/0144081 A1 May 2, 2024

(51) Int. Cl.
G06N 20/00 (2019.01)
G06V 10/774 (2022.01)

(52) U.S. Cl.
CPC ........... G06N 20/00 (2019.01); G06V 10/774 (2022.01)

(58) Field of Classification Search
CPC .......... G06N 20/00; G06N 3/045; G06N 3/08; G06V 10/774; G06V 10/776; G06V 10/82
See application file for complete search history.

(56) References Cited

U.S. PATENT DOCUMENTS 11,989,626 B2 * 5/2024 Arnold .................... G06F 17/18
2021/0097407 A1 * 4/2021 Pan ........................ G06N 20/00
2021/0183367 A1 * 6/2021 Sharifi .................... G10L 15/22
2021/0350274 A1 * 11/2021 Pfitzmann ........... G06F 11/3409
2021/0365793 A1 * 11/2021 Surya .................... G06N 3/0475
2022/0044149 A1 * 2/2022 Rand ...................... G06N 20/00
2022/0164667 A1 * 5/2022 Saki .................... G06F 18/2431

OTHER PUBLICATIONS

"OCI Vision", Available Online at: https://www.oracle.com/in/artificial-intelligence/vision/, Accessed from Internet on May 6, 2022, 7 pages.
Baylor et al., "Continuous Training for Production ML in the TensorFlow Extended (TFX) Platform", 2019 USENIX Conference on Operational Machine Learning (OpML 19), May 20, 2019, pp. 51-53.
De Lange et al., "A Continual Learning Survey: Defying Forgetting in Classification Tasks", IEEE Transactions on Pattern Analysis and Machine Intelligence, Available Online at: https://arxiv.org/pdf/1909.08383.pdf, Apr. 16, 2021, 29 pages.
Diethe et al., "Continual Learning in Practice", 32nd Conference on Neural Information Processing Systems (NIPS 2018), Available Online at: arXiv preprint arXiv:1903.05202, Mar. 18, 2019, 9 pages.

(Continued)

*Primary Examiner* — Imad Kassim
(74) *Attorney, Agent, or Firm* — Kilpatrick Townsend & Stockton LLP

(57) ABSTRACT

Continual learning techniques are described for extending the capabilities of a base model, which is trained to predict a set of existing or base classes, to generate a target model that is capable of making predictions for both the existing or base classes and additionally for making predictions for new or custom classes. The techniques described herein enable the target model to be trained such that the model can make predictions involving both base classes and custom classes with high levels of accuracy.

20 Claims, 15 Drawing Sheets

(56)                    References Cited

OTHER PUBLICATIONS

Hung et al., "Compacting, Picking and Growing for Unforgetting Continual Learning", Advances in Neural Information Processing Systems 32 (2019), 11 pages.

Hung et al., "Compacting, Picking and Growing for Unforgetting Continual Learning", Available Online at: arXiv preprint arXiv:1910.06562, Oct. 30, 2019, 12 pages.

Joseph et al., "Towards Open World Object Detection", Proceedings of the IEEE/CVF Conference on Computer Vision and Pattern Recognition, Available Online at: https://arxiv.org/pdf/2103.02603.pdf, May 9, 2021, 16 pages.

Kaushik et al., "Understanding Catastrophic Forgetting and Remembering in Continual Learning with Optimal Relevance Mapping", Available Online at: arXiv preprint arXiv:2102.11343, Feb. 22, 2021, 17 pages.

Kirkpatrick et al., "Overcoming Catastrophic Forgetting in Neural Networks", Proceedings of the National Academy of Sciences (PNAS), vol. 114, No. 13, Available Online at: https://www.pnas.org/doi/pdf/10.1073/pnas.1611835114, Mar. 28, 2017, pp. 3521-3526.

Li et al., "Learning without Forgetting", IEEE Transactions on Pattern Analysis and Machine Intelligence, vol. 40, No. 12, Available Online at: https://arxiv.org/pdf/1606.09282.pdf, Feb. 14, 2017, pp. 1-13.

Masana et al., "Class-Incremental Learning: Survey and Performance Evaluation on Image Classification", Available Online at: arXiv preprint arXiv:2010.15277, May 6, 2021, pp. 1-26.

Prabhu et al., "GDumb: A Simple Approach that Questions Our Progress in Continual Learning", European Conference on Computer Vision, Available Online at: https://www.ecva.net/papers/eccv_2020/papers_ECCV/papers/123470511.pdf, Aug. 23, 2020, 17 pages.

Rebuffi et al., "iCaRL: Incremental Classifier and Representation Learning", Proceedings of the IEEE conference on Computer Vision and Pattern Recognition, Available Online at: https://arxiv.org/pdf/1611.07725.pdf, Apr. 14, 2017, pp. 1-15.

Swaminathan et al., "Now Easily Perform Incremental Learning on Amazon SageMaker", Available Online at: https://aws.amazon.com/blogs/machine-learning/now-easily-perform-incremental-learning-on-amazon-sagemaker/, Nov. 7, 2018, 5 pages.

Tu et al., "Extending Conditional Convolution Structures For Enhancing Multitasking Continual Learning", 2020 Asia-Pacific Signal and Information Processing Association Annual Summit and Conference (APSIPA ASC). IEEE, 2020, Available Online at: http://www.apsipa.org/proceedings/2020/pdfs/0001605.pdf, Dec. 7-10, 2020, pp. 1605-1610.

Wang et al., "Wanderlust: Online Continual Object Detection in the Real World", Proceedings of the IEEE/CVF International Conference on Computer Vision, Available Online at: https://arxiv.org/pdf/2108.11005.pdf, Sep. 7, 2021, pp. 1-10.

"Incremental Training in Amazon SageMaker", Available Online at: https://docs.aws.amazon.com/sagemaker/latest/dg/incremental-training.html, Accessed from Internet on May 6, 2022, 3236 pages.

* cited by examiner

FIG. 1B

MODEL TRAINING SYSTEM 100

COMMUNICATION NETWORK 128

USER COMPUTER 126

USER COMPUTER 126

USER COMPUTER 126

FIG. 1C

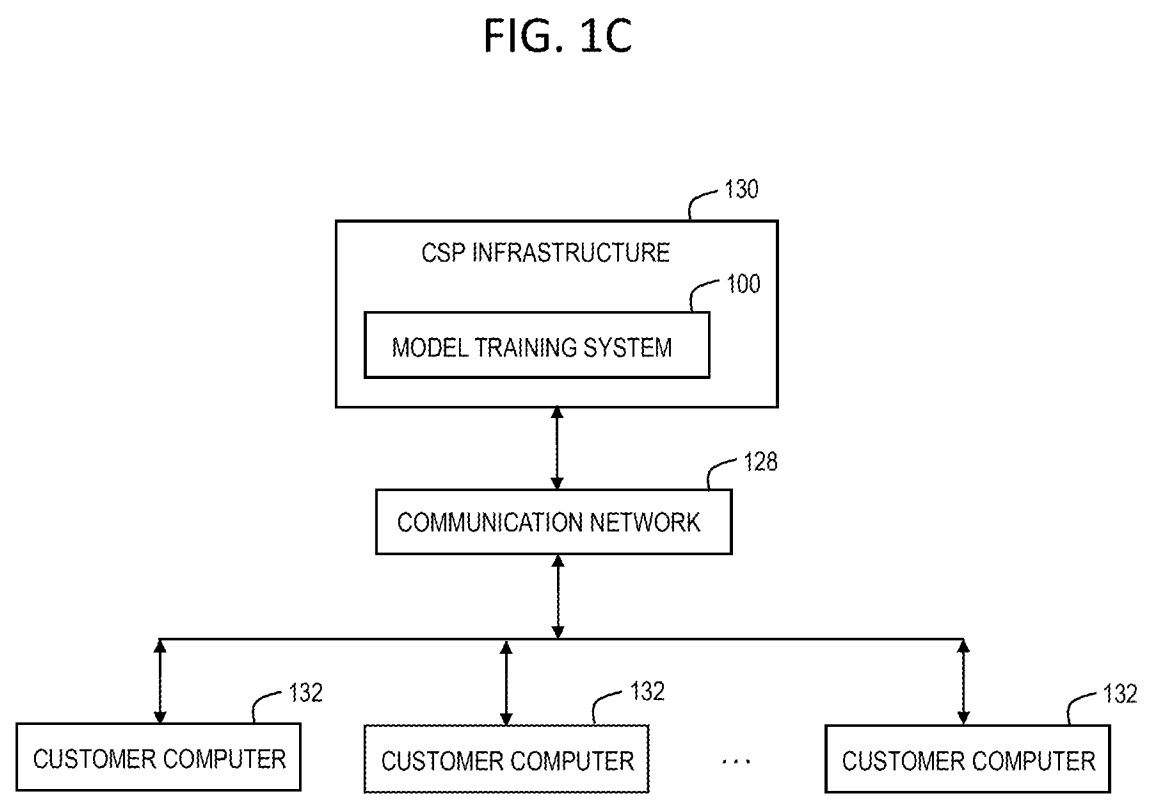

CSP INFRASTRUCTURE 130

MODEL TRAINING SYSTEM 100

COMMUNICATION NETWORK 128

CUSTOMER COMPUTER 132

CUSTOMER COMPUTER 132

CUSTOMER COMPUTER 132

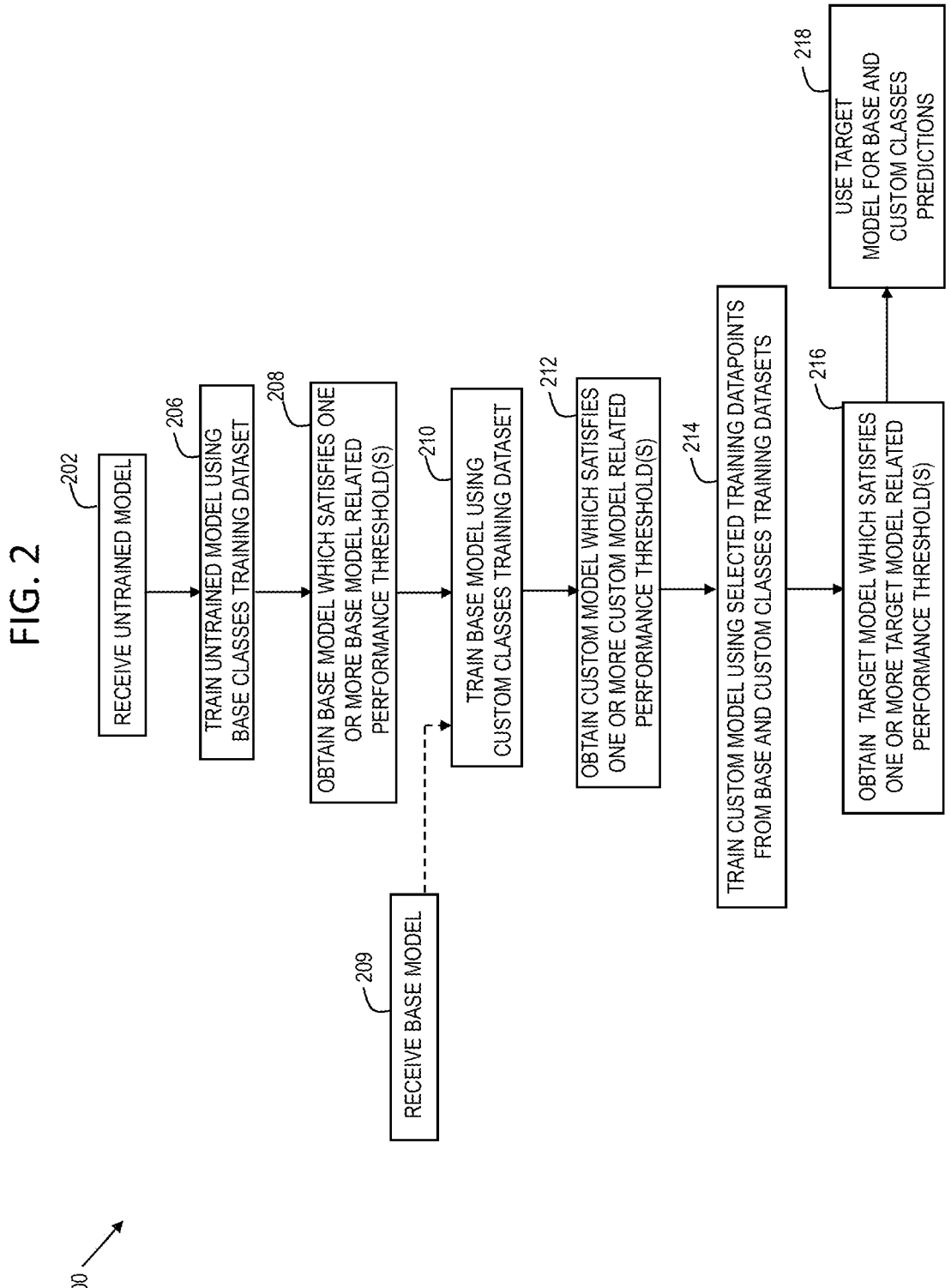

202 RECEIVE UNTRAINED MODEL

206 TRAIN UNTRAINED MODEL USING BASE CLASSES TRAINING DATASET

208 OBTAIN BASE MODEL WHICH SATISFIES ONE OR MORE BASE MODEL RELATED PERFORMANCE THRESHOLD(S)

209 RECEIVE BASE MODEL

210 TRAIN BASE MODEL USING CUSTOM CLASSES TRAINING DATASET

212 OBTAIN CUSTOM MODEL WHICH SATISFIES ONE OR MORE CUSTOM MODEL RELATED PERFORMANCE THRESHOLD(S)

214 TRAIN CUSTOM MODEL USING SELECTED TRAINING DATAPOINTS FROM BASE AND CUSTOM CLASSES TRAINING DATASETS

216 OBTAIN TARGET MODEL WHICH SATISFIES ONE OR MORE TARGET MODEL RELATED PERFORMANCE THRESHOLD(S)

218 USE TARGET MODEL FOR BASE AND CUSTOM CLASSES PREDICTIONS

Figure 3A:
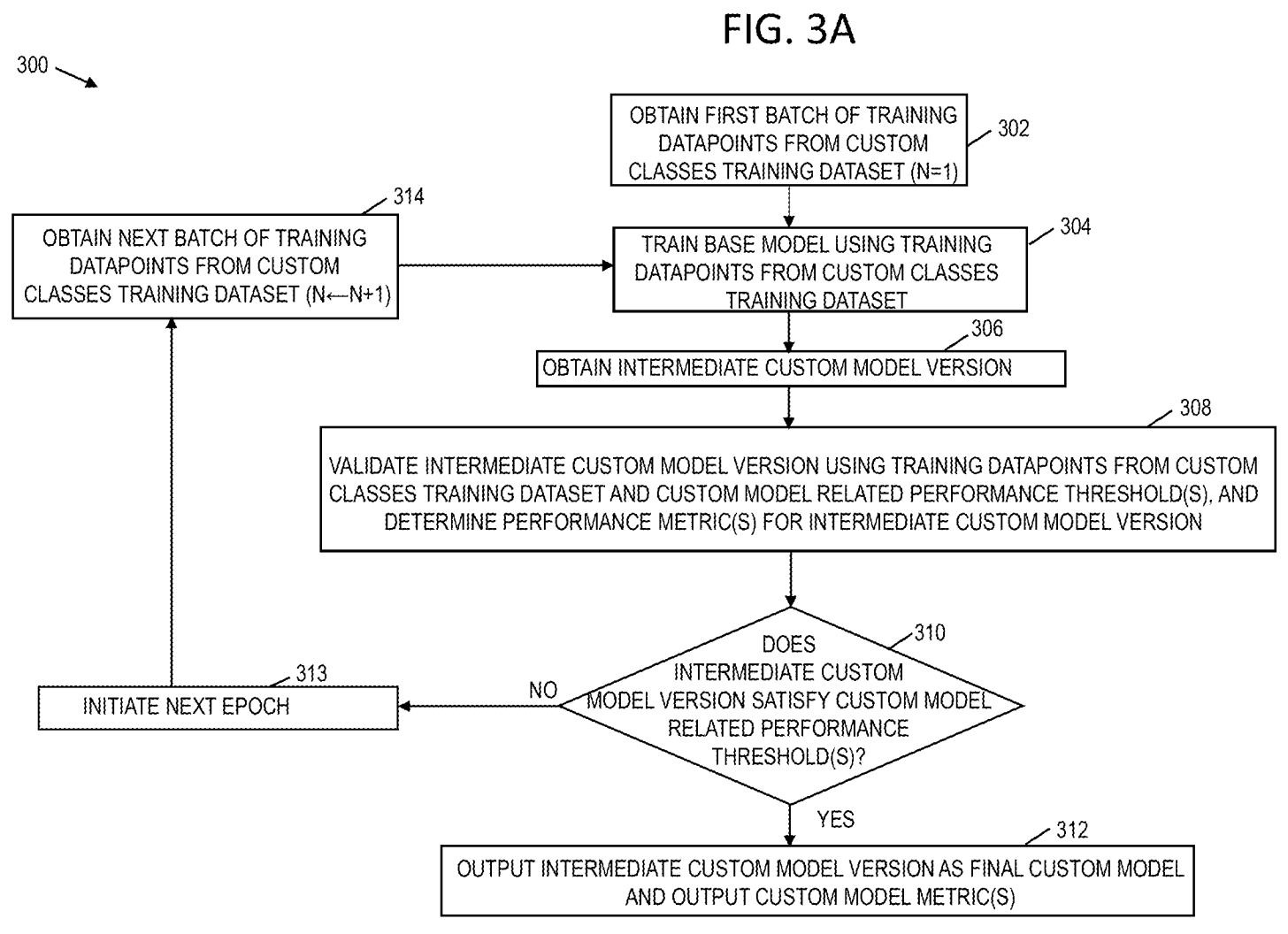

OBTAIN FIRST BATCH OF TRAINING DATAPOINTS FROM CUSTOM CLASSES TRAINING DATASET (N=1) — 302

TRAIN BASE MODEL USING TRAINING DATAPOINTS FROM CUSTOM CLASSES TRAINING DATASET — 304

OBTAIN INTERMEDIATE CUSTOM MODEL VERSION — 306

VALIDATE INTERMEDIATE CUSTOM MODEL VERSION USING TRAINING DATAPOINTS FROM CUSTOM CLASSES TRAINING DATASET AND CUSTOM MODEL RELATED PERFORMANCE THRESHOLD(S), AND DETERMINE PERFORMANCE METRIC(S) FOR INTERMEDIATE CUSTOM MODEL VERSION — 308

DOES INTERMEDIATE CUSTOM MODEL VERSION SATISFY CUSTOM MODEL RELATED PERFORMANCE THRESHOLD(S)? — 310

NO

INITIATE NEXT EPOCH — 313

OBTAIN NEXT BATCH OF TRAINING DATAPOINTS FROM CUSTOM CLASSES TRAINING DATASET (N←N+1) — 314

YES

OUTPUT INTERMEDIATE CUSTOM MODEL VERSION AS FINAL CUSTOM MODEL AND OUTPUT CUSTOM MODEL METRIC(S) — 312

FIG. 4B

FROM 408

DOES INTERMEDIATE TARGET MODEL VERSION SATISFY FIRST THRESHOLD(S) FOR BASE CLASSES? 442

YES

DOES INTERMEDIATE TARGET MODEL VERSION SATISFY SECOND THRESHOLD(S) FOR CUSTOM CLASSES? 444

YES

DOES OVERALL METRIC(S) OF INTERMEDIATE TARGET MODEL VERSION HIGHER THAN OVERALL METRIC(S) OF ANY INTERMEDIATE TARGET MODEL VERSION OF PREVIOUS ITERATIONS? 448

NO

NO

NO

RETRAIN? 424

YES

TO 430

NO

TERMINATE 426

YES

OUTPUT INTERMEDIATE TARGET MODEL VERSION AS FINAL TARGET MODEL 422

FIG. 5

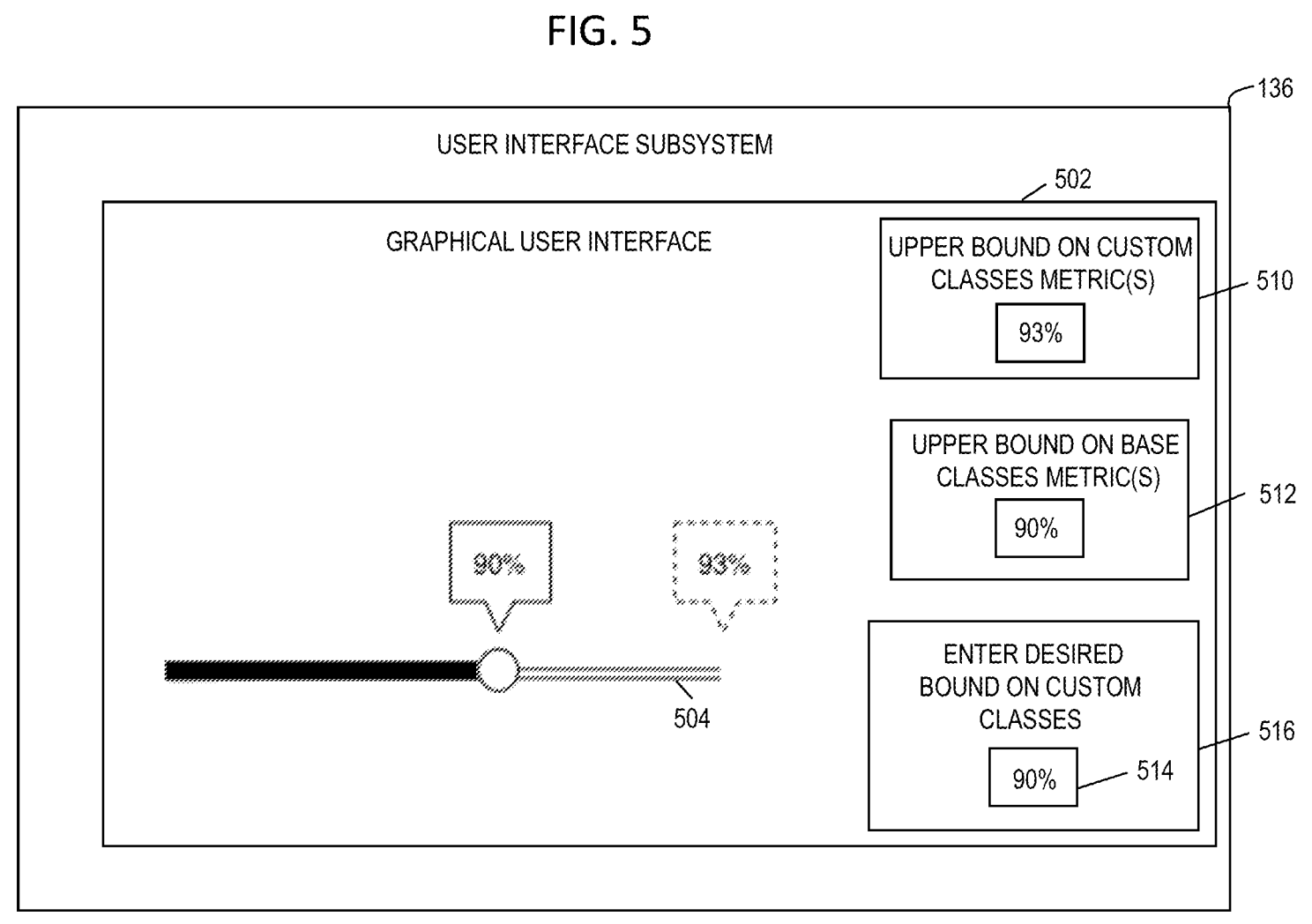

USER INTERFACE SUBSYSTEM

136

502

GRAPHICAL USER INTERFACE

UPPER BOUND ON CUSTOM
CLASSES METRIC(S)

510

93%

UPPER BOUND ON BASE
CLASSES METRIC(S)

512

90%

ENTER DESIRED
BOUND ON CUSTOM
CLASSES

516

90%

514

90%

93%

504

CONTINUAL LEARNING TECHNIQUES FOR TRAINING MODELS

BACKGROUND

Machine learning (ML) is an area of artificial intelligence (AI) where computers have the capability to learn without being explicitly programmed. There are different types of ML techniques including supervised learning techniques, unsupervised learning techniques, and others. In a supervised learning technique, an ML model is created and trained using training data, where the training data includes multiple training examples, each training example including an input and a known output corresponding to the input. An input can include one or multiple features.

As a part of the training, the model being trained learns a function that maps the inputs in the training data to their corresponding known outputs. After a model has been adequately trained using the training data, it can then be used for making output predictions for new inputs where the outputs are not known. This is often referred to as the inferencing phase.

Models trained using supervised learning techniques are typically used to solve two types of tasks: a classification task or a regression task. For a classification task, as a part of the training, a model learns a function that maps an input to an output value, where the output value is from a discrete set of classes (or class labels). Accordingly, in a classification problem, the model learns to map an input to one or more of the classes in a set of discrete classes. For a regression task, the model learns a function that maps inputs to continuous output values (e.g., continuous real numbers).

In AI/ML-based classification tasks, the number of classes in the set of classes that a model has been trained to predict is often fixed. For example, there may be five classes and the model is trained to predict a class from those five classes for an input provided to the model. There are situations and use cases where it is desired that the set of existing classes be extended to include new classes and the model be trained to make inferences or predictions for both the existing classes and the new classes. This is however a non-trivial task. As a model is retrained for the new classes, the model tends to forget about the existing classes, and as a result the model's accuracy with respect to the existing classes drops.

The process of retraining a model to learn new skills (e.g., the ability to predict new classes in addition to existing classes) is sometimes referred to as continual training.

BRIEF SUMMARY

The present disclosure relates generally to machine learning techniques. More particularly, novel continual learning techniques described herein are for extending the capabilities of a base model, which is trained to predict a set of existing classes, e.g., base classes, to generate a target model capable of making predictions for the base classes and additionally for making predictions for new classes, e.g., custom classes. The techniques described herein enable the target model to be trained such that the model can make predictions involving both base classes and custom classes with high levels of accuracy. Various embodiments are described herein to illustrate various features. These embodiments include various methods, systems, non-transitory computer-readable storage media storing programs, code, or instructions executable by one or more processors, and the like.

In certain implementations, the target model is able to make predictions involving custom classes at a desired high level of accuracy while maintaining the model's accuracy for making predictions for the base classes at high acceptable levels. For example, the target model's performance for making predictions involving base classes approaches the performance of the base model on the base classes that was achieved when the base model was generated to predict a set of base classes, or, in some embodiments, may be better than the performance of the base model on the base classes that was achieved when the base model was generated to predict a set of base classes, while the target model's performance for making predictions involving custom classes is better than the performance of the base model on the base classes that was achieved when the base model was generated to predict a set of base classes. In some embodiments, the target model's performance for making predictions involving custom classes may be higher than the target model's performance for making predictions involving base classes, and in some embodiments, the target model's performance for making predictions involving base classes may be higher than the target model's performance for making predictions involving custom classes.

In certain implementations, a method is provided. The method includes training, by a model training system, a base model using a custom classes training dataset to generate a custom model, the custom classes training dataset including training datapoints associated with a plurality of custom classes, where the base model is a model trained using a base classes training dataset which includes training datapoints associated with a plurality of base classes, where the plurality of custom classes are different from the plurality of base classes; and training, by the model training system, the custom model using a target model training dataset to generate a target model, the target model training dataset including a first plurality of datapoints selected from the training datapoints of the base classes training dataset and a second plurality of datapoints selected from the training datapoints of the custom classes training dataset, where the target model is trained to make predictions involving one or more classes from the plurality of base classes and from the plurality of custom classes.

The method further includes providing a first input to the target model; predicting, by the target model, a first prediction for the first input, where the first prediction is a class from the plurality of base classes; providing a second input to the target model; and predicting, by the target model, a second prediction for the second input, where the second prediction is a class from the plurality of custom classes.

The method further includes, prior to the training the base model to generate the custom model, training, by the model training system, a model using the base classes training dataset to generate the base model.

In certain implementations, the base model, the custom model, and the target model are neural network models.

In certain implementations, the base model is trained to generate the custom model by (a) generating an intermediate custom model version by training the base model using one or more first datapoints selected from the training datapoints of the custom classes training dataset; (b) determining a performance metric for the intermediate custom model version using one or more second datapoints selected from the training datapoints of the custom classes training dataset; (c) comparing the performance metric to a custom model related performance threshold; upon determining, based on the comparing in (c), that the performance metric meets the custom model related performance threshold, designating the intermediate custom model version as the custom model; and upon determining, based on the comparing in (c), that the performance metric does not meet the custom model related performance threshold, performing (d) which includes (e) generating a subsequent intermediate custom model version by training the intermediate custom model version, which was previously generated, using the one or more first datapoints and additional first datapoints that are selected from the training datapoints of the custom classes training dataset, (f) determining a performance metric for the subsequent intermediate custom model version using one or more second datapoints selected from the training datapoints of the custom classes training dataset, and (g) comparing the performance metric for the subsequent intermediate custom model version to the custom model related performance threshold; upon determining, based on the comparing in (g), that the performance metric meets the custom model related performance threshold, designating the subsequent intermediate custom model version as the custom model; and upon determining, based on the comparing in (g), that the performance metric does not meet the custom model related performance threshold, repeating (d) until determining that the performance metric for a particular subsequent intermediate custom version generated as a result of one of repetitions of (d) meets the custom model related performance threshold, and designating the particular subsequent intermediate custom model version as the custom model.

In certain implementations, the model training system is provided by a cloud services provider (CSP), the custom model related performance threshold is specified by a customer of the CSP, and the custom classes training dataset is provided by the customer.

In certain implementations, the custom model is trained to generate the target model by (a) generating an intermediate target model version by training the custom model using one or more first datapoints selected from the target model training dataset; (b) determining a performance metric for the intermediate target model version using one or more second datapoints selected from the target model training dataset; (c) comparing the performance metric to a target model related performance threshold; upon determining, based on the comparing, that the performance metric does not meet the target model related performance threshold, repeating one or more of (a), (b), and (c); and upon determining, based on the comparing, that the performance metric meets the target model related performance threshold, designating the intermediate target model version as the target model.

In certain implementations, the target model related performance threshold includes a base model related performance threshold and a custom model related performance threshold, the model training system is provided by a cloud services provider (CSP), at least one from among the base model related performance threshold and the custom model related performance threshold is specified by a customer of the CSP, and the custom classes training dataset is provided by the customer.

In certain implementations, the custom model is trained to generate the target model by receiving a first threshold related to a performance of the target model with respect to the plurality of base classes, and a second threshold related to a performance of the target model with respect to the plurality of custom classes; and training the custom model using the first plurality of datapoints, the second plurality of datapoints, the first threshold, and the second threshold to generate the target model, where at least one from among the first threshold and the second threshold is received through a user interface subsystem of the model training system.

In certain implementations, the custom model is trained using the first plurality of datapoints, the second plurality of datapoints, the first threshold, and the second threshold by (a) generating an intermediate target model version of a current epoch by training the custom model using one or more first datapoints among the first plurality of datapoints and one or more first datapoints among the second plurality of datapoints; (b) determining, for the intermediate target model version, a first performance metric for base classes datapoints using one or more second datapoints among the first plurality of datapoints; (c) determining, for the intermediate target model version, a second performance metric for custom classes datapoints using one or more second datapoints among the second plurality of datapoints; (d) determining, for the intermediate target model version, an overall performance metric for mixed classes datapoints including at least one datapoint selected from the first plurality of datapoints and at least one datapoint selected from the second plurality of datapoints; (e) comparing the first performance metric to the first threshold, the second performance metric to the second threshold, and the overall performance metric to a previously determined overall performance metric which was determined for a previously generated intermediate target model version generated in a previous epoch; (f) based on the comparing, determining whether at least one condition from among conditions including the first performance metric being not less than the first threshold, the second performance metric being not less than the second threshold, and the overall performance metric exceeding the previously determined overall performance metric is not satisfied; upon the determining that the at least one condition is not satisfied, repeating one or more of (a), (b), (c), (d), (e), and (f); and upon the determining that the conditions including the first performance metric being not less than the first threshold, the second performance metric being not less than the second threshold, and the overall performance metric exceeding the previously determined overall performance metric are satisfied, designating the intermediate target model version of the current epoch as the target model.

In certain implementations, the second threshold has a first value, and, when it is determined that the at least one condition is not satisfied, the repeating the one or more of (a), (b), (c), (d), (e), and (f) includes receiving a second value for the second threshold that is lower than the first value, the second threshold being related to the performance of the target model with respect to the plurality of custom classes; and repeating at least (e) and (f) using the second value for the second threshold.

The second value for the second threshold is received through a user interface subsystem of the model training system.

In certain implementations, when it is determined that the at least one condition is not satisfied, the repeating the one or more of (a), (b), (c), (d), (e), and (f) includes repeating (a), by modifying at least one from among a set including the one or more first datapoints among the first plurality of datapoints and a set including the one or more first datapoints among the second plurality of datapoints; and subsequently repeating (b), (c), (d), (e), and (f).

In certain implementations, it is determined that the at least one condition is not satisfied by determining that the first performance metric is less than the first threshold or the second performance metric is less than the second threshold, and the repeating (a) further includes adding more datapoints corresponding to the plurality of base classes to the set including the one or more first datapoints among the first plurality of datapoints if the first performance metric is less than the first threshold, or adding more training datapoints corresponding to the plurality of custom classes to the set including the one or more first datapoints among the second plurality of datapoints if the second performance metric is less than the second threshold.

In certain implementations, it is determined that the at least one condition is not satisfied, and the repeating the one or more of (a), (b), (c), (d), (e), and (f) includes determining a first difference between a value associated with the first performance metric for the base classes datapoints and the first threshold; determining a second difference between a value associated with the second performance metric for the custom classes datapoints and the second threshold; based on the first difference and the second difference, determining whether a performance of the intermediate target model version is better for the base classes datapoints or the custom classes datapoints, where the performance of the interme- diate target model version is better for the custom classes datapoints if the first difference exceeds the second differ- ence, and the performance of the intermediate target model version is better for the base classes datapoints if the second difference exceeds the first difference; repeating (a) by performing one from among adding more datapoints to the one or more first datapoints of the second plurality of datapoints, upon determining that the performance of the intermediate target model version is better for the base classes datapoints, and adding more datapoints to the one or more first datapoints of the first plurality of datapoints, upon determining that the performance of the intermediate target model version is better for the custom classes datapoints; and subsequently repeating (b), (c), (d), (e), and (f).

In certain implementations, a non-transitory computer- readable medium is provided. non-the transitory computer- readable medium stores computer-executable instructions that, when executed by one or more computer systems of a model training system, cause the model training system to perform a method including training, by the model training system, a base model using a custom classes training dataset to generate a custom model, the custom classes training dataset including training datapoints associated with a plu- rality of custom classes, where the base model is trained using a base classes training dataset which includes training datapoints associated with a plurality of base classes, where the plurality of custom classes are different from the plu- rality of base classes; and training, by the model training system, the custom model using a target model training dataset to generate a target model, the target model training dataset including a first plurality of datapoints selected from the training datapoints of the custom classes training dataset and a second plurality of datapoints selected from the training datapoints of the base classes training dataset, where the target model is trained to make predictions involving one or more classes from the plurality of base classes and from the plurality of custom classes.

In certain implementations, a system is provided. The system includes one or more computer systems configured to perform a method including: training a base model using a custom classes training dataset to generate a custom model, the custom classes training dataset including training datapoints associated with a plurality of custom classes, where the base model is trained using a base classes training dataset which includes training datapoints associated with a plurality of base classes, where the plurality of custom classes are different from the plurality of base classes; and training the custom model using a target model training dataset to generate a target model, the target model training dataset including a first plurality of datapoints selected from the training datapoints of the custom classes training dataset and a second plurality of datapoints selected from the training datapoints of the base classes training dataset, where the target model is trained to make predictions involving one or more classes from the plurality of base classes and from the plurality of custom classes.

The foregoing, together with other features and embodi- ments will become more apparent upon referring to the following specification, claims, and accompanying draw- ings.

BRIEF DESCRIPTION OF THE DRAWINGS

FIG. 1B is a simplified block diagram of a model training system in a distributed computing environment according to an embodiment.

FIG. 1C is a simplified block diagram of a model training system in a cloud service provider infrastructure according to an embodiment.

FIG. 2 depicts a simplified flowchart depicting processing performed by a model training system according to certain embodiments.

FIG. 3A depicts a simplified flowchart depicting process- ing performed by a model training system according to certain embodiments.

FIG. 4B depicts a simplified flowchart depicting a portion of processing performed by a model training system accord- ing to certain embodiments.

FIG. 5 depicts a simplified block diagram of a portion of a model training system according to certain embodiments.

DETAILED DESCRIPTION

Figure 1A:
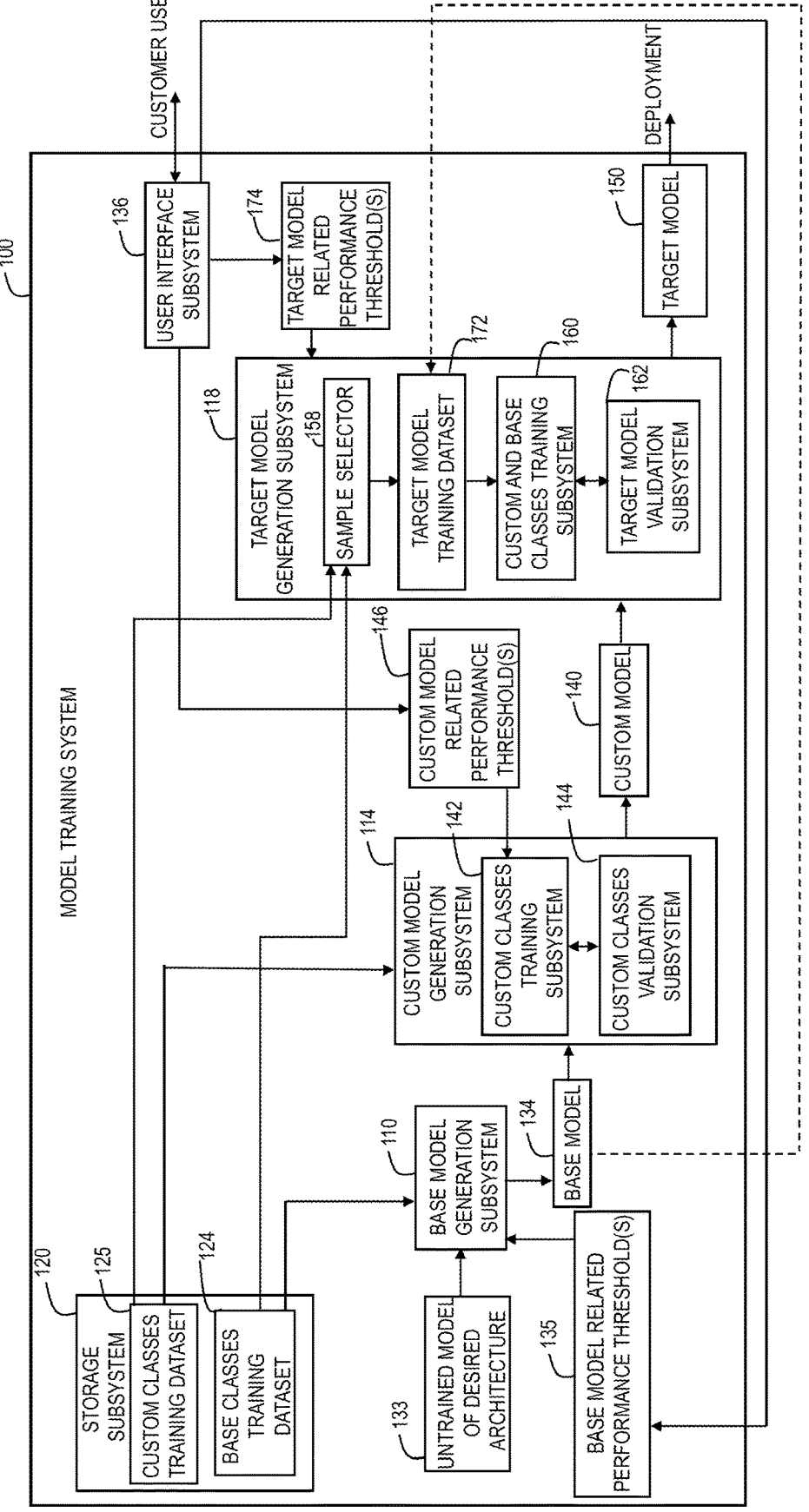
FIG. 1A is a simplified block diagram of a model training system according to an embodiment.

In the following description, for the purposes of expla- nation, specific details are set forth in order to provide a thorough understanding of certain embodiments. However, it will be apparent that various embodiments may be prac- ticed without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to machine learning techniques. More particularly, novel continual learning techniques described herein are for extending (e.g., updating) the capabilities of a base model, which is trained to predict a set of existing classes, e.g., base classes, to generate a target model capable of making predictions for the existing classes and additionally for making predictions for new classes, e.g., custom classes. The techniques described herein enable the target model to be trained such that the model can make predictions involving both base classes and custom classes with high levels of accuracy.

In certain implementations, the target model is able to make predictions involving custom classes at a desired high level of accuracy while maintaining the model's accuracy for making predictions for the base classes at high acceptable levels. For example, the target model's performance for making predictions involving base classes approaches the performance of the base model on the base classes that was achieved when the base model was generated to predict a set of base classes, or, in some embodiments, may be better than the performance of the base model on the base classes that was achieved when the base model was generated to predict a set of base classes, while the target model's performance for making predictions involving custom classes is better than the performance of the base model on the base classes that was achieved when the base model was generated to predict a set of base classes. In some embodiments, the target model's performance for making predictions involving custom classes may be higher than the target model's performance for making predictions involving base classes, and in some embodiments, the target model's performance for making predictions involving base classes may be higher than the target model's performance for making predictions involving custom classes.

For purposes of this disclosure, an existing class is also referred to as a base class, and a new class is also referred to as a custom class.

For purposes of this disclosure, a base classes training dataset is a dataset in which, for all the training datapoints in the dataset, the outputs are base classes.

For purposes of this disclosure, a custom classes training dataset is a dataset in which, for all the training datapoints in the dataset, the outputs are custom classes.

As described in the Background section, there are situations and use cases where it is desired that a set of existing base classes be extended to include new custom classes and a model be trained to make inferences or predictions for the existing base classes and the new custom classes. As one example, a model may be trained to make predictions over a fixed set of base classes. Such a model may be referred to as the base model. Over time, there may be a need to extend the functionality of the model to make predictions with respect to one or more custom classes in addition to the base classes. For example, a base model may have been trained to identify dogs and cats in images. There may be a need to extend this base model to identify other animals, such as horses, in the images. The classes "dog" and "cat" are the base classes, and the "horse" class is the custom class.

As another example, instead of building a model from scratch, a user may start out with and leverage an off-the-shelf pretrained base model. The user may then extend the set of base classes in the pretrained base model to include custom classes that are relevant to the user's use case. For example, a user may start out with an off-the-shelf base model trained to identify a certain set of objects (classes) from a video stream (e.g., video stream captured by a car's camera), where the set of objects can include thousands of base classes. The user may want to extend this set of classes to include one or more custom classes of interest to the user.

As yet another example, a cloud services provider (CSP) may provide one or more cloud services that make use of models for making predictions. Customers of the CSP can subscribe to one or more of these services. In such a context, the CSP may provide pretrained models that have been built and trained by the CSP using internal training datasets provided by the CSP. These pretrained models may support a large, predefined set of base classes or categories (e.g., classes corresponding to objects that a model can detect in a scene or in an image). The CSP may also provide its customers the ability to build custom models using their own customized datasets where the custom models are built by extending (or updating) the pretrained base models. For example, the customized datasets may add new custom classes to the base classes. A model is then generated from a pretrained base model, where the model is trained to make predictions for the base classes and the custom classes.

As previously indicated in the Background section, extending a base model's capability to make predictions for custom classes is a non-trivial task. Several continual learning methods have been proposed based upon approaches such as model growing, knowledge distillation, regularization, and/or replay or rehearsal of dataset. In such approaches, first, a base model is generated using base classes training dataset to support base classes. Next, the base model is trained using a custom classes dataset resulting in a model that supports both base and custom classes. Existing approaches however have several limitations.

For example, one problem with some of the existing continual learning approaches is that, as a base model gets trained on the custom classes, it loses a substantial amount of information about the base classes. As a result, while the model gains the ability to make predictions on the custom classes, its accuracy regarding predictions on the base classes diminishes to unacceptable levels. Another problem with some of the existing continual learning approaches is that the model's performance related to the predictions involving the custom classes is quite low and might be lower than the performance of the model with respect to the base classes.

One of the reasons that these problems of the existing continual learning approaches occur is because the user is offered very little control over the model's accuracy with respect to predictions regarding base classes, the model's accuracy with respect to predictions regarding custom classes, and the model's overall prediction accuracy. Lack of user's control also results in more iterations and longer training times for the model training. As a result, the existing continual learning approaches do not provide a viable solution in commercial settings.

In the past, one approach to overcome some of the above problems has been to offer two separate models for performing the classifications tasks: one pretrained base model to perform classifications for the base classes and a separate custom model trained for making predictions for the custom classes. However, this approach suffers from poor use of computational resources. For example, an input (e.g., an image) is analyzed twice—by the pretrained base model supporting the base classes and the custom model supporting the custom classes. This increases computations twofold and results in a less than desirable end user experience. Ideally, it would be preferable to serve a single model, where the single model can make predictions with respect to both base classes and custom classes with high levels of accuracy.

The present disclosure describes continual learning solutions that are not plagued by the above-mentioned problems. Techniques are described for extending the capabilities of a base model, which is trained to predict a set of base classes, to generate a target model capable of making predictions for both the base classes and new custom classes with high levels of accuracy.

In certain implementations, the training is broken up into three separate training stages. In a first training stage, a base model is built by training a model of a chosen architecture using a base classes training dataset the includes training data related only to base classes. In certain situations where the base model is already available (e.g., when a pretrained off-the-shelf base model is available), there may be no need to perform the first training stage, and processing may start with the second training stage.

In a second training stage, the base model is trained using a custom classes training dataset that includes training datapoints related only to the custom classes. The output of the second training stage is a custom model. In certain implementations, training is iterated in the second training stage until the model achieves the best possible performance on the custom classes, e.g., the best feasible performance on the custom classes with a given custom classes training dataset. Thus, an objective in the second training stage is to maximize the custom classes performance with less intervention to maintain base classes performance. Accordingly, in certain implementations, in the second training stage, the model is iteratively trained to achieve a best possible performance with respect to the custom classes, without attempting to also maintain the good performance on the base classes.

In the third training stage, the custom model generated in the second training stage is trained using training datapoints selected from both the base classes training dataset and the custom classes training dataset. The target model is generated by applying continual learning methods to the custom model with a goal to regain the performance of the model on the base classes to acceptable levels while maintaining control over the model's performance with respect to custom classes at acceptable levels. In certain embodiments, in the third training stage, continual learning training is performed on the model such that the model regains good performance on the base classes while maintains an acceptable performance on the custom classes. The resultant target model is capable of making predictions for both base classes and custom classes at a high level of accuracy, as compared to the systems and methods of the related art. In some implementations, a target model generated according to the techniques described herein has a performance on the custom classes that is improved by a factor of 1.2 over the conventional continual learning methods. This makes the techniques described herein well suited for commercial settings.

The accuracy of the target model generated at the third training stage is not degraded for predictions regarding the base classes. The techniques described herein enable a model to quickly learn new tasks (i.e., predictions for custom classes) without forgetting the previously learnt tasks (i.e., predictions for base classes). As a result of the novel training techniques described herein, the model is able to integrate new information regarding custom classes while minimizing an interference with the existing knowledge regarding base classes. For example, if the base model is an image classifier that supports a 10-way classification, and if the set of classes is expanded to include two new previously unseen custom classes, the training techniques described in this disclosure enable the model to learn the custom classes via continuous learning techniques such that the resultant target model is able to perform 12-way classification including both the base classes and the custom classes. Resource efficiency is achieved where the training time is less, and training data size increases marginally.

As described herein, a single model (the target model) is built that can make predictions for both the base classes and the custom classes with high levels of accuracy. The offering of a single model with improved accuracy results in efficient use of computational resources. Further, the target model can be continually expanded to make predictions for additional custom classes using the techniques described in this disclosure, allowing for efficiently extending the capabilities of the target model.

The techniques described herein offer finer control over the model's performance. As described below, a training infrastructure is provided that enables the training performed in each of three training stages to be controlled such that the model's performance meets the desired levels of accuracy. For example, in the first training stage in which a model is trained using base classes training data to generate a base model, the model can be iteratively trained until the base model's performance meets or exceeds a user-specified or desired accuracy threshold (e.g., performance metric(s)) with respect to predictions for the base classes. In the second training stage, in which the base model is trained using custom classes training data to generate a custom model, the model can be iteratively trained until the model's performance meets or exceeds a user-specified or desired accuracy threshold (e.g., performance metric(s)) with respect to predictions for custom classes. In the third training stage, in which the custom model is trained using training datapoints selected from the base and custom classes to generate a target model, the model can be iteratively trained until the model's performance meets or exceeds a user-specified or desired performance metric(s) with respect to predictions for base classes, with respect to predictions for custom classes, and with respect to overall model's performance for base and custom classes. This allows a user to have a full control over the desired performance on the resultant target model.

For example, in some implementations, a user is provided with control on the base and custom classes performance. For example, the performance of the model (e.g., quantified by a performance metric) on the base classes obtained after the first training stage, and the performance of the model (e.g., quantified by a performance metric) on the custom classes obtained after the second training stage may be displayed to the user via a GUI. The GUI may also provide an interface that allows the user to, based upon the displayed metric(s), set acceptable performance metric(s) for the target model with respect to performance on the base classes and the custom classes. In certain implementations, the GUI may provide a user selectable and adjustable control that allows the user to specify the acceptable performance metric(s) based on whether the base classes performance or the custom classes performance is more important for the user in the target model to be generated in the third training stage.

In some implementations, faster processing may be achieved by improving the custom classes performance before starting the third training stage to generate the target model, thereby reducing a number of overall model iterations. This improves the functioning of the computer by reducing computational resources. As a result, the custom classes metric(s) may be obtained that satisfy acceptable or desired threshold(s) with the available custom classes training dataset at the second training stage, before the commencement of the training at the third training stage to generate the target model. As such, the time and resources consuming lengthy training processing to generate the target model may be postponed until the custom model meets the acceptable or desired threshold(s). Thus, fewer iterations are used for improving the performance of the model being developed at the third training stage, since the performance of the custom model is improved at an earlier stage, thereby the extensive computational resources for iterative training to generate the target model may be reduced.

In some implementations, during the training performed to generate the target model, the performance of the base classes and the performance of the custom classes may be simultaneously adjusted so that the overall performance of the resultant model obtained through the continual learning is not degraded and the class extension is adequately supported.

In certain implementations, the novel training techniques described herein can be provided by a CSP to its customers. For example, a customer may subscribe to a particular service (e.g., a chatbot service). As a part of the service, the CSP may provide one or more pretrained base models for that service that have been trained by the CSP using base classes training dataset that is internal to the CSP. For example, for the chatbot service, the base model may be trained to receive an utterance and identify an intent class corresponding to the utterance from a set of base intent classes. A subscribing customer may then provide the CSP with customer-specific custom classes training dataset that includes training datapoints involving custom classes outputs corresponding to new intents specific for that customer. The CSP may then provide a training infrastructure that is able of using the techniques described in this disclosure to generate a target model from a pretrained base model, where the target model is capable of making predictions for both the base classes and the custom classes at high levels of accuracy.

In certain implementations, the novel training techniques described herein themselves can be offered as a cloud service (e.g., a "continual training" service) by a CSP. The "continual training" service can be subscribed to by one or more customers of the CSP. For example, a base model to be used may be provided by the customer or may be provided by the CSP. A subscribing customer may then provide custom classes training dataset that includes training datapoints involving custom classes outputs specific for that customer's needs. The CSP may, as a part of the service, generate a target model from the base model and using the customer-provided custom classes training dataset according to the described techniques, where the target model is capable of making predictions for both the base classes and the custom classes at high levels of accuracy. Such a service may be useful for various domains such as image or video classification, language detection, and the like.

FIG. 1A is a simplified block diagram of a model training system 100 according to certain embodiments. The model training system 100 may be implemented using one or more computer systems, each computer system having one or more processors. The model training system 100 may include multiple components and subsystems communicatively coupled to each other via one or more communication mechanisms. For example, in the embodiment depicted in FIG. 1A, the model training system 100 includes a base model generation subsystem 110, a custom model generation subsystem 114, and a target model generation subsystem 118. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). Model training system 100 depicted in FIG. 1A is merely an example and is not intended to unduly limit the scope of embodiments. Many variations, alternatives, and modifications are possible. For example, in some implementations, model training system 100 may have more or fewer subsystems or components than those shown in FIG. 1A, may combine two or more subsystems, or may have a different configuration or arrangement of subsystems. The model training system 100 and subsystems depicted in FIG. 1A may be implemented using one or more computer systems, such as the computer system depicted in FIG. 12.

As shown in FIG. 1A, the model training system 100 also includes a storage subsystem 120 that may store the various data constructs and programs used by the model training system 100. For example, the storage subsystem 120 may store various training datasets such as a base classes training dataset 124 and a custom classes training dataset 125. However, this is not intended to be limiting. In alternative implementations, the base classes training dataset 124 and/or the custom classes training dataset 125 may be stored in other memory storage locations (e.g., different databases) that are accessible to the model training system 100, where these memory storage locations can be local to or remote from the model training system 100. In addition to the training datasets, other data used by the model training system 100 or generated by the model training system 100 as a part of its functioning may be stored in the storage subsystem 120. For example, information identifying various threshold(s) and metric(s) used by or determined by the model training system 100 may be stored in the storage subsystem 120.

Figure 1B:
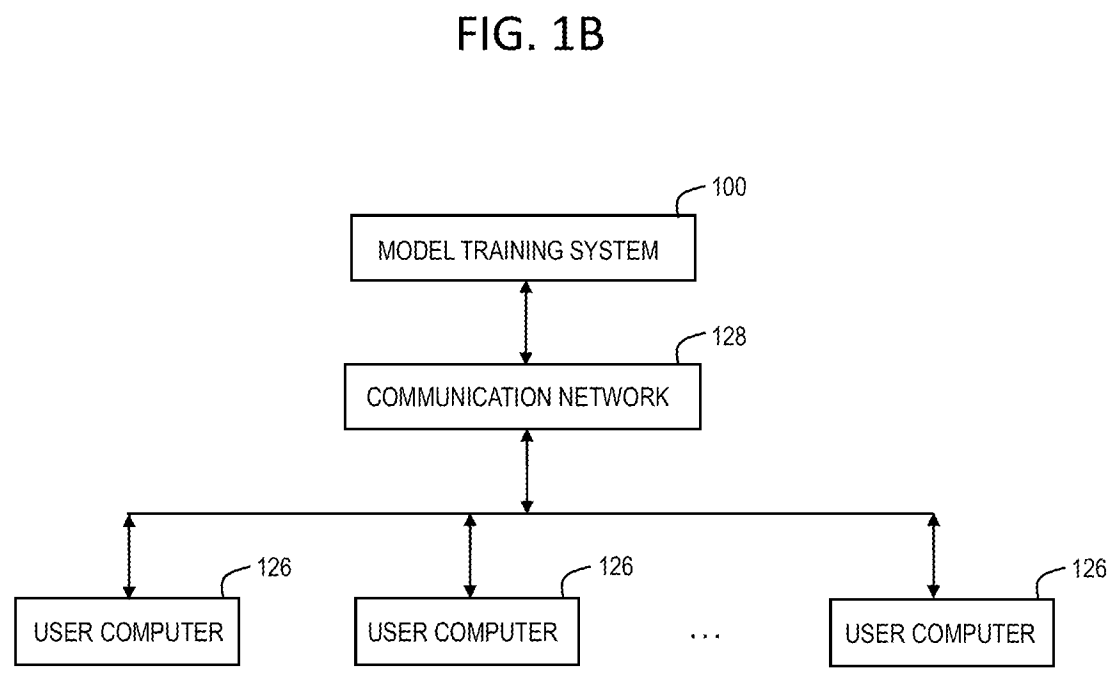

As shown in FIG. 1B, the model training system 100 can be provided as a part of a distributed computing environment, where the model training system 100 is connected to one or more user computers 126 via a communication network 128.

As shown in FIG. 1C, the model training system 100 may be a part of a CSP infrastructure 130 provided by a CSP for providing one or more cloud services to one or more customer computers 132. Examples of cloud infrastructure architecture provided by the CSP are depicted in FIGS. 8-11 and described in detail below.

The model training system 100 is configured to perform multiple-stage training on an input untrained model, and output a single model capable of making predictions involving the base classes and additionally for making predictions involving custom classes with high levels of accuracy.

In some implementations, the model training performed by the model training system 100 includes three training stages that are performed by the base model generation subsystem 110, the custom model generation subsystem 114, and the target model generation subsystem 118, respectively. Each of these training stages and the functions performed by these subsystems are described below in more detail.

The base model generation subsystem 110 is configured to perform training corresponding to the first training stage. The base model generation subsystem 110 receives, as an input, an untrained model 133 of a desired architecture. The base model generation subsystem 110 then performs processing on the untrained model 133 corresponding to the first training stage, which results in the generation of a base model 134, which is output by the base model generation subsystem 110. The output base model is then used as an input for the second training stage performed by the custom model generation subsystem 114.

In some implementations, the architecture of the untrained model 133 may be one of the architectures known to those skilled in the relevant art as being appropriate for the task. For example, a residual neural network (ResNet) model may be used for image classification tasks, a region-based convolutional neural network (RCNN) model may be used for object detection tasks, a transformer based architectures may be used for natural language processing (NLP) tasks, etc. However, this is not intended to be limiting, and, in some implementations, the architecture of the untrained model 133 may be a specialized architecture to support continual learning training performed by the target model generation subsystem 118.

As a part of the first training stage, the base model generation subsystem 110 is configured to further receive an input from the base classes training dataset 124 and train the untrained model 133 using the base classes training dataset 124. The base classes training dataset 124 includes training datapoints, each training datapoint including an input and a corresponding output corresponding to the input, and the output is a class label identifying a base class. In the base classes training dataset 124, all of the training datapoints have outputs that are classes from the base classes.

As an example, the base model generation subsystem 110 performs training on the untrained model 133 using a portion of the training datapoints from the base classes training dataset 124, and performs a validation using another portion of the training datapoints from the base classes training dataset 124 and base model related performance threshold(s) 135, e.g., one or more performance threshold(s) configured for training performed by the base model generation subsystem 110. However, this is not intended to be limiting and the base model generation subsystem 110 may perform the validation using a different method.

In an example depicted in FIG. 1A, the base model related performance threshold(s) 135 are shown as being received from a user interface subsystem 136, e.g., via a user input, which affords the user more control over the training performed in the first training stage. For example, in the cloud environment, the model related threshold(s) can be set by the CSP or a customer subscribing to a cloud service provided by the CSP where the training is performed as a part of the service. However, the described-above is not intended to be limiting, and the base model related performance threshold (s) 135 may be empirically determined.

In the course of processing performed by the base model generation subsystem 110, versions of the base model are generated by iteratively performing the first training stage. For example, training performed by the base model generation subsystem 110 may include several iterations, each iteration including a training phase and a validation phase. The training phase in each iteration results in the generation of a base model version. In the validation phase of the iteration, one or more performance metric(s) of the base model version are determined using the base classes training dataset 124. However, this is not intended to be limiting, and the validation phase may be performed after a certain number of iterations is performed at the training phase. As a part of the validation processing, the determined performance metric(s) are compared to the base model related performance threshold(s) 135 which define the acceptable performance for the base model.

For example, the base model related performance threshold(s) 135 may correspond to one or more performance metric(s) configured for the training performed at the first training stage that may continue until the base model related performance threshold(s) 135 are satisfied, e.g., until the performance metric(s) determined for one of the base model versions meet the base model related performance threshold (s) 135 (or until the value(s) of the performance metric(s) determined for one of the base model versions are not less than corresponding base model related performance threshold(s) 135).

If the performance metric(s) determined for the base model version meet the base model related performance threshold(s) 135, it indicates that the base model version has reached an acceptable level of performance. This may result in ending the first training stage and designating the base model version of a particular iteration, e.g., a last iteration, as the final base model. In this manner, the untrained model is iteratively trained using one or more training datapoints selected from the base classes training dataset until a particular base model version meets one or more performance thresholds configured for the training performed by the base model generation subsystem 110. This particular base model version may be designated as a final base model and provided to custom model generation subsystem 114.

Accordingly, as a result of the training performed by the base model generation subsystem 110, the base model generation subsystem 110 may provide, as an output, the base model 134 which satisfies the base model related performance threshold(s) 135 and is capable of predicting the base classes with high accuracy. At the conclusion of the first training stage, the base model generation subsystem 110 may also determine and provide the base model metric(s) indicative of an upper bound of the performance of the base model 134 on the base classes. In some implementations, the base model 134 and/or the base model metric(s) may be stored in the storage subsystem 120 or in any other storage device usable by the model training system 100 and/or the base model generation subsystem 110.

In some implementations, the training performed by the base model generation subsystem 110 may be performed offline, e.g., the untrained model 133 is trained offline with relatively large volumes of training datapoints of the base classes training dataset 124 for relatively long duration.

In certain embodiments, the base model, which satisfies one or more base model related performance threshold(s) 135, and the base model metric(s) may already be available and may be obtained from the storage subsystem 120 or from another storage device which stores information related to the base model and/or the model training system 100. For example, as described above, the CSP may provide pretrained models that have been built and trained by the CSP using internal training datasets provided by the CSP. These pretrained models may support a large, predefined set of base classes or categories (e.g., classes corresponding to objects that a model can detect in a scene or in an image). These pretrained models can be used for the customers of the CSP services. In such embodiments, where a pretrained base model is already available (e.g., available off-the-shelf), there might be no need to perform the first training stage, and, in such situations, the pretrained base model may be provided to the custom model generation subsystem 114 as an input and processing may start from the second training stage.

The custom model generation subsystem 114 is configured to perform training corresponding to the second training stage. The custom model generation subsystem 114 receives the base model 134 (or the off-the-shelf base model) as an input. The custom model generation subsystem 114 then performs processing corresponding to the second training stage, which results in the generation of a custom model 140, which is then output by the custom model generation subsystem 114. The custom model 140 is used as an input for the third training stage performed by the target model generation subsystem 118.

Training performed by the custom model generation subsystem 114 may include several iterations, each iteration including a training phase and a validation phase. The training phase in each iteration results in the generation of an intermediate custom model version based on the custom classes training dataset 125. In the validation phase of the iteration, one or more performance metric(s) of the intermediate custom model version are determined using the custom classes training dataset 125. Further, as a part of the validation processing, the determined performance metric(s) are compared to one or more performance thresholds configured for the second training stage, where the performance threshold(s) define the acceptable performance for the custom model. If the performance metric(s) determined for the intermediate custom model version meet the performance threshold(s), it indicates that the intermediate custom model version has reached an acceptable level of performance. This may result in ending the second training stage and designating the intermediate custom model version as the final custom model 140. In this manner, the base model is iteratively trained using one or more training datapoints selected from the custom classes training dataset until a particular intermediate custom model version meets performance threshold(s) configured for the training performed by the custom model generation subsystem 114. The particular intermediate custom model version may be provided to the target model generation subsystem 118 as the custom model 140.

In certain implementations, the custom model generation subsystem 114 includes a custom classes training subsystem 142 and a custom classes validation subsystem 144. The custom classes training subsystem 142 receives, as an input, the base model 134, and iteratively trains the base model 134 using the custom classes training dataset 125, to generate one or more intermediate custom model versions. The custom classes training dataset 125 includes training datapoints, each training datapoint including an input and a corresponding output corresponding to the input, and the output is a class label identifying a custom class. In the custom classes training dataset 125, all of the training datapoints have outputs that are classes from the custom classes. The custom classes are different from the base classes, and the training datapoints included in the custom classes training dataset 125 are different from the training datapoints included in the base classes training dataset 124. For example, the base classes include a dog class and a cat class, but do not include a horse class. The custom classes may include a horse class.

In some implementations, the training datapoints included in the custom classes training dataset 125 may be split into a first portion including first datapoints to be used for the training phase, and a second portion including second datapoints or validation datapoints to be used for the validation phase. In embodiments, the first training datapoints from the custom classes training dataset 125 may be different from the second training datapoints from the custom classes training dataset 125. However, this is not intended to be limiting, and the first training datapoints from the custom classes training dataset 125 may partially overlap the second training datapoints.

The custom classes training subsystem 142 may perform training using the base model 134 and the first datapoints from the custom classes training dataset 125, and the custom classes validation subsystem 144 may perform a validation of the result of the training performed by the custom classes training subsystem 142 using the second datapoints from the custom classes training dataset 125 and the custom model related performance threshold(s) 146, e.g., one or more performance threshold(s) configured for the training performed by the custom model generation subsystem 114.

In an example depicted in FIG. 1A, the custom model related performance threshold(s) 146 are shown as being received from the user interface subsystem 136, e.g., via a user input, which affords the user more control over the training performed in the second training stage. For example, in the cloud environment, the custom model related threshold(s) can be set by the CSP or a customer subscribing to a cloud service provided by the CSP where the training is performed as a part of the service.

In the validation phase of the iteration, one or more performance metric(s) of the intermediate custom model version are determined using the custom classes training dataset 125. Further, as a part of the validation processing, the determined performance metric(s) of the intermediate custom model version are compared to the custom model related performance threshold(s) 146 which define the acceptable performance for the custom model.

For example, the custom model related performance threshold(s) 146 may correspond to one or more performance metric(s) configured for the training performed at the second training stage that may continue until the custom model related performance threshold(s) 146 are satisfied, e.g., until the performance metric(s) determined for the intermediate custom model version in one of the iterations meet the custom model related performance threshold(s) 146 (or until the value(s) of the performance metric(s) determined for the intermediate custom model version in one of the iterations are not less than corresponding custom model related performance threshold(s) 146). However, this is not intended to be limiting, and the validation phase may be performed after a certain number of iterations is performed at the training stage.

If the validation phase is not passed, the custom classes training subsystem 142 and the custom classes validation subsystem 144 may perform retraining using the base model 134, training datapoints obtained from the custom classes training dataset 125, and the custom model related performance threshold(s) 146. However, this is not intended to be limiting, and, in some embodiments, the retraining may be performed using the intermediate custom model version, training datapoints obtained from the custom classes training dataset 125, and the custom model related performance threshold(s) 146, as described in detail below with reference to FIG. 3B. For example, for the retraining, the training datapoints obtained from the custom classes training dataset 125 may be at least partially different from the training datapoints used by the custom classes training subsystem 142 in the previous training cycle on the base model. In some implementations, the custom model related performance threshold(s) 146 may be changed.

As a result of the training performed by the custom classes training subsystem 142 and the validation performed by the custom classes validation subsystem 144, the custom model generation subsystem 114 may provide, as an output, the custom model 140 which satisfies the custom model related performance threshold(s) 146 and is capable of predicting the custom classes. In some implementations, at the conclusion of the second training stage, the custom model generation subsystem 114 may also determine and provide the custom model metric(s) indicative of an upper bound of the performance of the custom model 140 on the custom classes. In some implementations, the custom model 140 and/or the custom model metric(s) may be stored in the storage subsystem 120 or in any other storage device usable by the model training system 100 and/or the custom model generation subsystem 114.

The custom model generation subsystem 114 may perform training to maximize the custom classes performance by applying training techniques such as transfer learning. The training process may be iterated by exploring various options to improve the performance of the finally output custom model, for example, by increasing a number of training datapoints that may be obtained from the custom classes training dataset 125, as described below with reference to FIGS. 3A and 3B. Thus, the custom classes performance with the given training dataset may be assessed before the continual training to support the base classes is performed. This shortens time needed for the overall training because the training does not need to proceed till the very end to find out the performance metric(s) of the custom model. The performance metric(s) of the custom model may be perfected before the continual training to support the base classes is performed.

As described above, the custom model generation subsystem 114 may perform training to maximize the custom classes performance, and the custom classes performance achieved in the second training stage may serve as an upper bound for the final custom classes performance in the third training stage performed to generate the target model to support both the base classes and the custom classes.

Accordingly, in embodiments, the custom model may be obtained to satisfy the maximized performance metric(s) before the training proceeds to the next stage, e.g., the continual learning stage, to generate the target model which may be used to predict both base classes and custom classes.

In the third training stage, the target model generation subsystem 118 performs a continual learning training to extend the number of classes supported by the custom model obtained by the custom model generation subsystem 114 by regaining the support for the base classes. The target model generation subsystem 118 receives the custom model 140 as an input. The target model generation subsystem 118 then performs processing corresponding to the third training stage, which results in the generation of a target model 150, which is then output by the target model generation subsystem 118. The output target model is used for predictions involving the base classes and the custom classes.

Training performed by the target model generation subsystem 118 may include several iterations, each iteration including a training phase and a validation phase. The training phase in each iteration results in the generation of an intermediate target model version based on the base classes training dataset 124 and the custom classes training dataset 125. In the validation phase of the iteration, one or more performance metric(s) of the intermediate target model version are determined using the base classes training dataset 124 and the custom classes training dataset 125. Further, as a part of the validation processing, the determined performance metric(s) are compared to one or more performance thresholds configured for the third training stage, where the performance threshold(s) define the acceptable performance for the target model. If the performance metric(s) determined for the intermediate target model version meet the performance threshold(s), it indicates that the intermediate target model version has reached an acceptable level of performance. This may result in ending the third training stage and designating the intermediate target model version as the final target model 150. In this manner, the custom model is iteratively trained using one or more training datapoints selected from the base classes training dataset 124 and the custom classes training dataset 125 until a particular intermediate target model version meets the performance threshold(s) configured for the third training stage performed by the target model generation subsystem 118. The particular intermediate target model version may be provided to the target model generation subsystem 118 as the custom model 140.

However, the described above is not intended to be limiting. For example, in some implementations, the base classes training dataset 124 may not be readily available at the third training stage, e.g., due to the privacy considerations. The information related to the base classes may be obtained from the base model 134 as shown by a dotted line in FIG. 1A and used in the training phase and the validation phase. As another example, in some implementations, where the base classes training dataset 124 is not readily available, the information related to the base classes may be obtained through the knowledge distillation.

In certain implementations, the target model generation subsystem 118 may include a sample selector 158. For example, the sample selector 158 may select at least one datapoint from the base classes training dataset 124, e.g., at least one sample datapoint, and at least one datapoint from the custom classes training dataset 125, e.g., at least one sample datapoint. A number of the sample datapoints from each of the base classes training dataset 124 and the custom classes training dataset 125 is not intended to be limiting, and may be 10, . . . 100, . . . , 1000, etc. The selected sample datapoints from the base classes training dataset and the custom classes training dataset may be accumulated, for example, in a target model training dataset 172. However, this is not intended to be limiting and the target model training dataset 172 may be omitted.

In some implementations, the target model generation subsystem 118 may include a custom and base classes training subsystem 160 and a target model validation subsystem 162.

The custom and base classes training subsystem 160 receives, as an input, the custom model 140 and iteratively trains the custom model 140 using the sample datapoints from the target model training dataset 172. The target model training dataset 172 includes sample datapoints, e.g., training datapoints corresponding to mixed classes, each training datapoint including an input and a corresponding output corresponding to the input, and the output is a class label identifying a base class or a custom class. In the target model training dataset 172, all of the training datapoints have outputs that are classes from both the base classes and the custom classes, e.g., the mixed classes.

In some implementations, the sample datapoints included in the target model training dataset 172 may be split into a first portion including first datapoints to be used for the training phase, and a second portion including second datapoints or validation datapoints to be used for the validation phase. In embodiments, the first datapoints from the target model training dataset 172 may be different from the second datapoints from the target model training dataset 172. However, this is not intended to be limiting, and the first datapoints from the target model training dataset 172 may partially overlap the second datapoints.

The custom and base classes training subsystem 160 may perform training using the custom model 140 and the first datapoints from the target model training dataset 172, and the target model validation subsystem 162 may perform a validation of the result of the training performed by the custom and base classes training subsystem 160 using second datapoints, e.g., validation datapoints, from the target model training dataset 172 and the target model related performance threshold(s) 174, e.g., one or more performance threshold(s) configured for the training performed by the target model generation subsystem 118.

In an example depicted in FIG. 1A, the target model related performance threshold(s) 174 are shown as being received from the user interface subsystem 136, e.g., via a user input, which affords the user more control over the training performed in the third training stage. For example, in the cloud environment, the target model related performance threshold(s) 174 can be set by the CSP or a customer subscribing to a cloud service provided by the CSP where the training is performed as a part of the service.

For example, the target model related performance threshold(s) 174 may correspond to one or more performance metric(s) configured for the training performed at the third training stage that may continue until the target model related performance threshold(s) 174 are satisfied, e.g., until the performance metric(s) determined for the intermediate target model version in one of the iterations meet the target model related performance threshold(s) 174 (or until the value(s) of the performance metric(s) determined for the intermediate target model version in one of the iterations are equal to or exceed corresponding target model related performance threshold(s) 174).

The target model related performance threshold(s) 174 may include various threshold(s). For example, at least one of the base classes metrics, obtained at the conclusion of the training performed by the base model generation subsystem 110, may serve as an upper bound, e.g., a threshold, related to the performance of the target model on the base classes. Similarly, at least one of the custom classes metrics, obtained at the conclusion of the training performed by the custom model generation subsystem 114, may serve as an upper bound, e.g., a threshold, related to the performance of the target model on the custom classes. However, this is not intended to be limiting, and, in some implementations, the upper bound threshold(s) related to the performance of the target model on the base classes and/or the upper bound threshold(s) related to the performance of the target model on the custom classes may be determined empirically or set based on a user preference. Further, the target model related performance threshold(s) 174 may include a measure related to overall performance metric(s) of the target model for the base classes and the custom classes, e.g., for the mixed classes. For example, the measure related to overall performance metric(s) may be one or more thresholds that are preconfigured and related to the performance of the target model on the mixed classes. As another example, the measure may be a result of a comparison of the overall performance metric(s) determined for the intermediate target model version obtained in a current iteration to the overall performance metric(s) previously determined for the intermediate target model version(s) obtained in one or more of previous iterations, with a goal to obtain a model with the best overall performance metric(s). For the first iteration, a value or values for the comparison may be prestored.

The operations performed at the validation phase by the target model generation subsystem 118 are described in a greater detail below with reference to FIGS. 4A and 4B.

If the validation phase is not passed, the custom and base classes training subsystem 160 and the target model validation subsystem 162 may perform retraining. In some embodiments, for the retraining of the target model, the sample selector 158 may select different training datapoints from the base classes training dataset 124 and/or the custom classes training dataset 125. In some embodiments, for the retraining of the target model, the target model related performance threshold(s) may be changed. The retraining operations performed by the target model generation subsystem 118 are described in a greater detail below with reference to FIGS. 4A and 4B.

The custom and base classes training subsystem 160 and the target model validation subsystem 162 may perform retraining on the custom and base classes until the target model related performance threshold(s) 174 are satisfied. The target model 150 that satisfies the target model related performance threshold(s) 174 may be output to be used for predictions involving both base classes and custom classes. For example, for an input of a datapoint provided as an input to the target model, the target model may be trained to predict a class from a set of classes including the base classes and the custom classes.

In some implementations, the target model generation subsystem 118 may also determine and provide the target model metric(s) indicative of the performance of the target model 150 on the base classes, the custom classes, and/or the mixed classes. In some implementations, the target model 150 and/or the target model metric(s) may be stored in the storage subsystem 120 or in any other storage device usable by the model training system 100 and/or the target model generation subsystem 118.

The target model generation subsystem 118 may perform training to maximize the performance of the target model on the base classes and the custom classes. The training process may be iterated by exploring various options to improve the performance of the finally output target model, for example, by increasing or decreasing a number of datapoints that may be obtained from the base classes training dataset 124 and/or the custom classes training dataset 125, and/or adjusting the target model related performance threshold(s) 174, as described below with reference to FIGS. 4A and 4B. Thus, due to the availability of user control or customer control provided by the described techniques, the target model with optimized performance and high prediction accuracy may be obtained and the training time and computational resources may be reduced.

FIG. 2 depicts a simplified flowchart depicting processing 200 performed by a model training system 100 according to certain embodiments. For example, the processing 200 depicted in FIG. 2 may be performed by some or all of the base model generation subsystem 110, the custom model generation subsystem 114, and the target model generation subsystem 118.

The processing 200 depicted in FIG. 2 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing operations occurring in a particular sequence or order, this is not intended to be limiting. In certain alternative embodiments, the processing 200 may be performed in some different order or some operations may be performed in parallel.

With continuing reference to FIG. 2 and referring again to FIG. 1A, at 202, the base model generation subsystem 110 may receive, as an input, untrained model 133 of a desired architecture. The base model generation subsystem 110 may also receive datapoints from the base classes training dataset 124.

At 206, the base model generation subsystem 110 may train the untrained model 133 using the base classes training dataset 124, based on one or more base model related performance threshold(s) 135.

At 208, the base model generation subsystem 110 may obtain, as a result of training performed at 206, the base model which satisfies one or more base model related performance threshold(s) 135.

In some implementations, operations 202, 206, and 208 may be omitted. In such implementations, at 209, the base model, which satisfies one or more base model related performance threshold(s) 135 may be received from the storage subsystem 120 or from another storage device which stores information related to the base model and/or the model training system 100.

At 210, the custom model generation subsystem 114 may train the base model using datapoints from the custom classes training dataset 125, based on one or more custom model related performance threshold(s) 146.

At 212, the custom model generation subsystem 114 may obtain, as a result of training performed at 210, the custom model which satisfies one or more custom model related performance threshold(s) 146.

At 214, the target model generation subsystem 118 may train the custom model using sample datapoints from the target model training dataset 172, e.g., selected datapoints from the base classes training dataset 124 and selected datapoints from the custom classes training dataset 125, based on one or more target model related performance threshold(s) 174. However, this is not intended to be limiting, and, in some implementations, where the training datapoints used for training the base model are not available, the target model generation subsystem 118 may train the custom model using selected training datapoints from the custom classes training dataset 125 and information derived from the base model and/or knowledge distillation, based on one or more target model related performance threshold(s) 174.

At 216, the target model generation subsystem 118 may obtain the target model which satisfies one or more target model related performance threshold(s) 174.

At 218, the target model obtained at 216 may be used for base classes and custom classes predictions.

FIG. 3A depicts a simplified flowchart depicting processing 300 performed by a model training system 100 according to certain embodiments. As an example, the processing 300 depicted in FIG. 3A may be performed by the custom model generation subsystem 114 and may correspond to operations 210 and 212 described above with reference to FIG. 2.

The processing 300 depicted in FIG. 3A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3A and described below is intended to be illustrative and non-limiting. Although FIG. 3A depicts the various processing operations occurring in a particular sequence or order, this is not intended to be limiting. In certain alternative embodiments, the processing 300 may be performed in some different order or some operations may be performed in parallel.

With continuing reference to FIG. 3A and referring again to FIG. 1A, at 302, the custom model generation subsystem 114 may obtain a first batch of training datapoints from the custom classes training dataset 125. In some implementations, a customer user may provide the first batch of training datapoints for the custom classes training dataset 125, for example, for the custom classes related to a business of the customer user.

At 304, the custom model generation subsystem 114 may train the base model using the training datapoints of the custom classes training dataset 125.

At 306, the custom model generation subsystem 114 may obtain an intermediate custom model version. The intermediate custom model version obtained at 306 may be a result of a single iteration or a result of a certain number of iterations. Herein, an intermediate custom model version obtained as a result of a single iteration or as a result of a number of iterations may be referred to as an intermediate custom model version obtained in an epoch, and a plurality of intermediate custom model versions may be obtained in a plurality of successive epochs, e.g., training epochs.

At 308, the custom model generation subsystem 114 may validate the intermediate custom model version using datapoints selected from the custom classes training dataset 125 and the custom model related performance threshold(s) 146, and may determine performance metric(s) for the intermediate custom model version.

At 310, the custom model generation subsystem 114 may determine whether the intermediate custom model version satisfies the custom model related performance threshold(s) 146, e.g., whether the performance metric(s) determined for the intermediate custom model version at 308 meet the custom model related performance threshold(s) 146.

If it is determined that the intermediate custom model version satisfies the custom model related performance threshold(s) 146, e.g., if it is determined that one or more performance metric(s) determined for the intermediate custom model version are not less than one or more corresponding custom model related performance threshold(s) 146 (YES in 310), the processing 300 proceeds to 312.

At 312, the custom model generation subsystem 114 may output the intermediate custom model version as a final custom model and output custom model metric(s) of that intermediate custom model version. For example, the custom model metric(s) output at 312 of FIG. 3A may indicate an accuracy of prediction involving the custom classes. In some embodiments, the custom model metric(s) may be an upper bound of the custom model metric(s), and may be representative of the best performance of the trained custom model with respect to the custom classes.

If it is determined that the intermediate custom model version does not satisfy the custom model related performance threshold(s) 146, e.g., if it is determined that one or more performance metric(s) determined for the intermediate custom model version at 308 is less than one or more corresponding custom model related performance threshold(s) 146 (NO in 310), the processing 300 proceeds to 313.

At 313, the custom model generation subsystem 114 initiates a next epoch to perform the additional training, to obtain the custom model satisfying the custom model related performance threshold(s) 146.

Figure 3B:
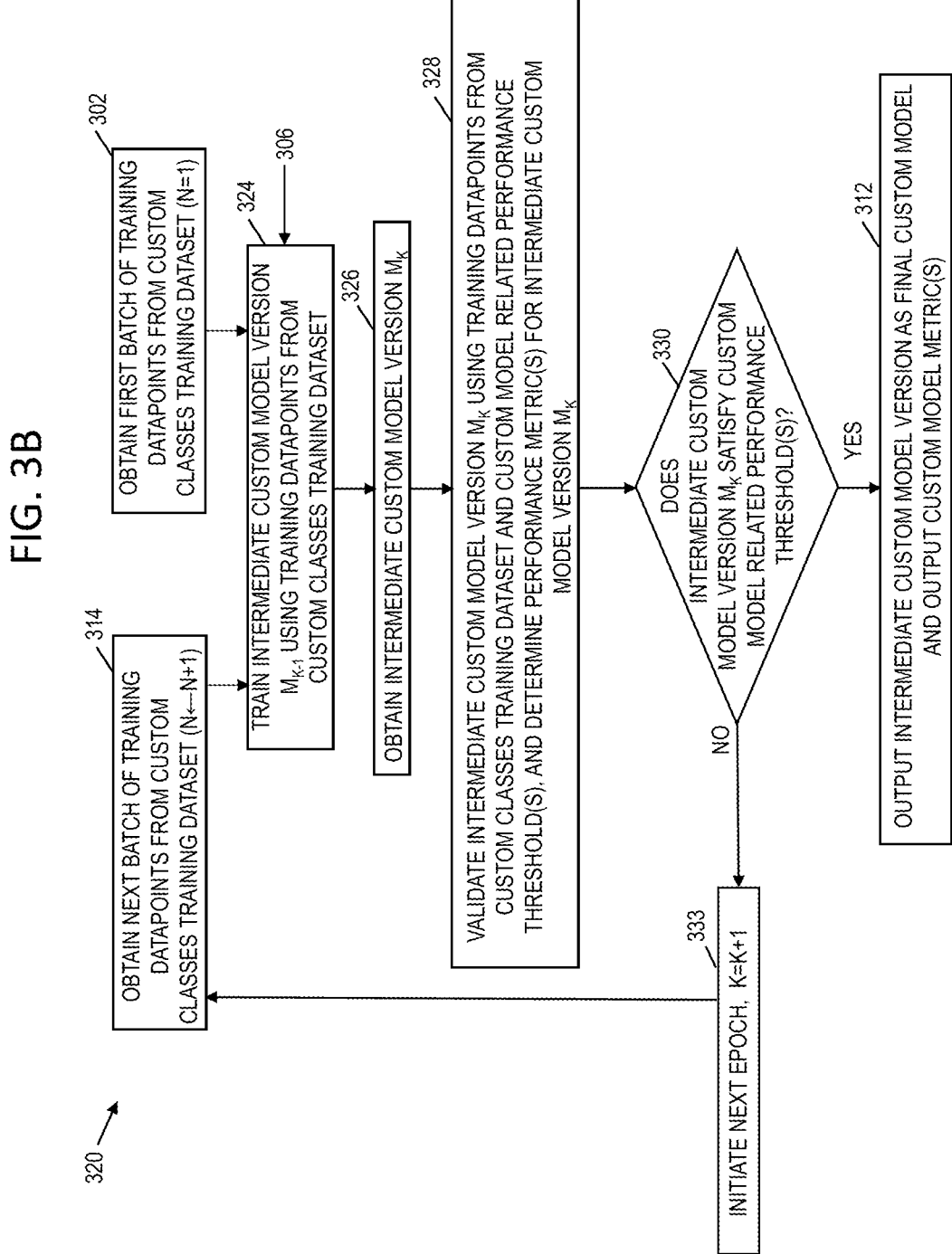
FIG. 3B depicts a simplified flowchart depicting process- ing performed by a model training system according to certain embodiments.

In an example of the processing depicted in FIG. 3A, the custom model generation subsystem 114 performs the additional training on the base model. However, this is not intended to be limiting, and, in some implementations, the custom model generation subsystem 114 performs the additional training on the intermediate custom model version, as described below with reference to FIG. 3B.

At 314, the custom model generation subsystem 114 may obtain a next batch of training datapoints from the custom classes training dataset 125. In some implementations, a customer user may provide the next batch, for example, by adding more training datapoints to the particular custom classes. The processing 400 may be then repeated starting with 304, by training the base model with the training datapoints obtained at 302 and additional training datapoints of the custom classes training dataset 125 obtained at 314. In some implementations, a customer user may change the custom training dataset with another custom training dataset. The processing 400 may be then repeated starting with 304, by training the base model with different training datapoints of the custom classes training dataset 125.

FIG. 3B depicts a simplified flowchart depicting a processing 320 performed by a model training system 100 according to certain embodiments. As an example, the processing 320 depicted in FIG. 3B may be performed by the custom model generation subsystem 114 and may correspond to operation 212 described above with reference to FIG. 2.

The processing 320 depicted in FIG. 3B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3B and described below is intended to be illustrative and non-limiting. Although FIG. 3B depicts the various processing operations occurring in a particular sequence or order, this is not intended to be limiting. In certain alternative embodiments, the processing 320 may be performed in some different order or some operations may be performed in parallel.

With reference to FIG. 3B and referring again to FIG. 1A, at 324, the custom model generation subsystem 114 may train the intermediate custom model version Mk-1 obtained in a previous epoch using the training datapoints of the custom classes training dataset 125. For example, the intermediate custom model version Mk-1 of the previous epoch is the intermediate custom model version obtained in 306 as a result of the training the base model at 304 of FIG. 3A. The number k relates to an epoch count and is greater than or equal to 2.

At 326, the custom model generation subsystem 114 may obtain an intermediate custom model version Mk of a current epoch. The intermediate custom model version Mk obtained at 326 may be a result of a single iteration or may be a result of a certain number of iterations. Operation 326 may correspond to operation 306 of FIG. 3A.

At 328, the custom model generation subsystem 114 may validate the intermediate custom model version Mk obtained at 326, by using datapoints selected from the custom classes training dataset 125 and the custom model related performance threshold(s) 146, and may determine performance metric(s) for the intermediate custom model version Mk of the current epoch. Operation 328 may correspond to operation 308 of FIG. 3A.

At 330, the custom model generation subsystem 114 may determine whether the intermediate custom model version Mk satisfies the custom model related performance threshold(s) 146, e.g., whether the performance metric(s) determined for the intermediate custom model version Mk meet the custom model related performance threshold(s) 146. Operation 330 may correspond to operation 310 of FIG. 3A.

If it is determined that the intermediate custom model version Mk satisfies the custom model related performance threshold(s) 146, e.g., if it is determined that one or more performance metric(s) determined for the intermediate custom model version Mk are not less than one or more corresponding custom model related performance threshold(s) 146 (YES in 330), the processing 300 proceeds to 312.

At 312, the custom model generation subsystem 114 may output the intermediate custom model version as a final custom model and output custom model metric(s) of that intermediate custom model version as described above with reference to FIG. 3A.

If it is determined that the intermediate custom model version does not satisfy the custom model related performance threshold(s) 146, e.g., if it is determined that one or more performance metric(s) determined for the intermediate custom model version Mk at 328 is less than one or more corresponding custom model related performance threshold(s) 146 (NO in 330), the processing 300 proceeds to 333.

At 333, the custom model generation subsystem 114 initiates a next epoch to perform the additional training, to obtain the custom model satisfying the custom model related performance threshold(s) 146.

At 314, the custom model generation subsystem 114 may obtain a next batch of training datapoints from the custom classes training dataset 125, and the processing may be then repeated starting with 324 for the next epoch.

Figure 4A:
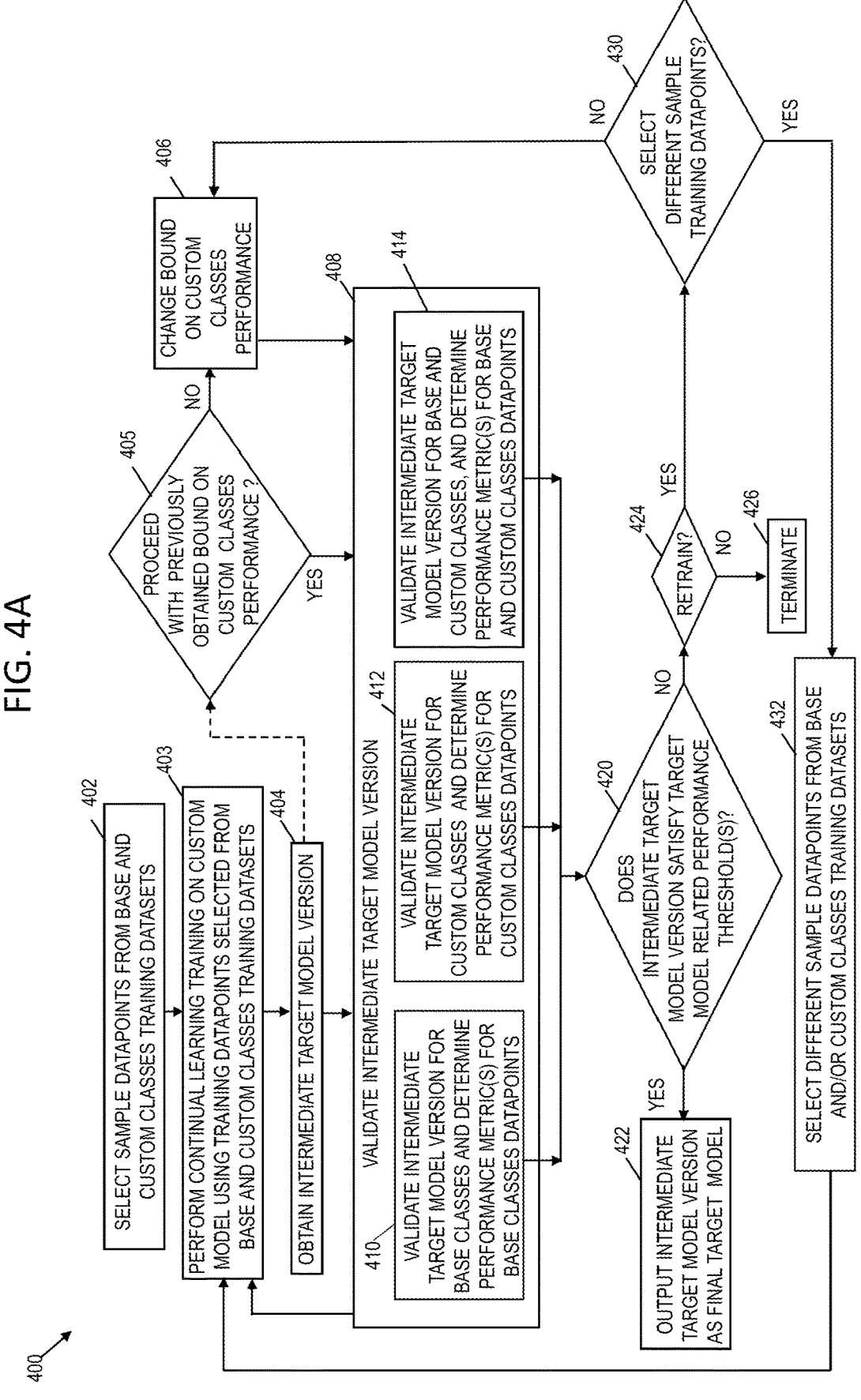
FIG. 4A depicts a simplified flowchart depicting process- ing performed by a model training system according to certain embodiments.

FIG. 4A depicts a simplified flowchart of a processing 400 performed by a model training system 100 according to certain embodiments. FIG. 4B depicts a simplified flowchart depicting a portion of processing 400 performed by a model training system 100 according to certain embodiments. As an example, the processing 400 depicted in FIGS. 4A and 4B may be performed by the target model generation subsystem 118 and may correspond to operations 214 and 216 described above with reference to FIG. 2.

The processing 400 depicted in FIGS. 4A and 4B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 4A and 4B and described below is intended to be illustrative and non-limiting. Although FIGS. 4A and 4B depict the various processing operations occurring in a particular sequence or order, this is not intended to be limiting. In certain alternative embodiments, the processing 400 may be performed in some different order or some operations may be performed in parallel.

With continuing reference to FIG. 4A and referring again to FIG. 1A, at 402, the sample selector 158 may select sample datapoints from the base classes training dataset 124 and the custom classes training dataset 125. For example, the selected training datapoints may be stored in the target model training dataset 172.

At 403, the custom and base classes training subsystem 160 may perform continual learning training on the custom model using the sample datapoints.

At 404, the custom and base classes training subsystem 160 may obtain an intermediate target model version corresponding to a single iteration or a number of iterations of a training phase. Herein, an intermediate target model version obtained as a result of a single iteration or as a result of a number of iterations may be referred to as an intermediate target model version obtained in an epoch, and a plurality of intermediate target model versions may be obtained in a plurality of successive epochs.

At 405, the target model generation subsystem 118 may determine whether the processing 400 is to proceed with a previously obtained bound, e.g., threshold, related to the performance of the target model on the custom classes. For example, the custom model metric(s) output at 312 of FIG. 3A or 3B may be used as the previously obtained bound related to the performance of the target model on the custom classes and, in this case, may represent an upper bound on the custom classes performance.

If it is determined to not proceed with a previously obtained bound related to the performance of the target model on the custom classes (NO in 405), the processing 400 may proceed with a changed bound.

At 406, the previously obtained bound related to the performance of the target model on the custom classes may be changed, for example, lowered. In some implementations, the lower bound on the custom classes performance may be determined by the target model generation subsystem 118. In some implementations, the lower bound on the custom classes performance may be configured by a customer of CSP and may be received via a user input through the user interface subsystem 136. However, this is not intended to be limiting, and, in some instances, the previously obtained bound related to the performance of the target model on the custom classes may be raised by using the methods described above.

If it is determined to proceed with a previously obtained bound related to the performance of the target model on the custom classes (YES in 405), the processing 400 may proceed to 408.

As indicated above, the described order of operations of the processing 400 is not intended to be limiting. For example, operation 405 and/or 406 may be performed in parallel with one or more of operations 402, 403, and 404, or may be performed before the operation 402, 403, or 404.

At 408, the target model validation subsystem 162 may validate the intermediate target model version obtained at 404, by performing operations 410, 412, and/or 414.

At 410, the target model validation subsystem 162 may validate the intermediate target model version with respect to the base classes using one or more training datapoints from the base classes training dataset 124 (or sample datapoints associated with the base classes from the target model training dataset 172) and determine performance metric(s) of the intermediate target model version for the base classes datapoints.

At 412, the target model validation subsystem 162 may validate the intermediate target model version with respect to the custom classes using one or more training datapoints from the custom classes training dataset 125 (or sample datapoints associated with the custom classes from the target model training dataset 172) and determine performance metric(s) of the intermediate target model version for the custom classes datapoints.

At 414, the target model validation subsystem 162 may validate the intermediate target model version with respect to the base classes and the custom classes using one or more training datapoints from the base classes training dataset 124 and one or more training datapoints from the custom classes training dataset 125 (or sample datapoints associated with the base classes and sample datapoints associated with the custom classes, e.g., mixed classes datapoints, from the target model training dataset 172). The target model validation subsystem 162 may determine overall performance metric(s) of the intermediate target model version for the base classes and the custom classes.

At 420, the target model generation subsystem 118 may determine whether the intermediate target model version satisfy the target model related performance threshold(s) based on the performance metric(s) of the intermediate target model version for the base classes datapoints, the performance metric(s) of the intermediate target model version for the custom classes datapoints, and the overall performance metric(s) of the intermediate target model version for the mixed classes. Processing performed with respect to 420 is described in more detail below with reference to FIG. 4B.

If it is determined that the intermediate target model version performance is satisfactory (YES in 420), the processing 400 proceeds to 422.

At 422, the intermediate target model version is output as a final target model. Also, the final performance metric(s) of the intermediate target model version for the base classes datapoints, the performance metric(s) of the intermediate target model version for the custom classes datapoints, and the overall performance metric(s) of the intermediate target model version for the mixed classes may be output and, optionally, displayed on the user interface subsystem 136.

If it is determined that the intermediate target model version performance is not satisfactory (NO in 420), the processing 400 proceeds to 424.

At 424, it is determined whether to retrain the custom model.

If it is determined to not retrain the custom model (NO in 424), the processing 400 is terminated at 426. In this case, the flow may return to operation 212 described above with reference to FIGS. 2 and 3, and the training related to the generation of the custom model may be repeated at least in part.

If it is determined to retrain the custom model (YES in 424), the processing 400 proceeds to 430.

At 430, it is determined whether to change the sample datapoints, e.g., whether to select different sample datapoints.

If it is determined to select different sample datapoints (YES in 430), the processing 400 proceeds to 432.

At 432, the sample selector 158 may select sample datapoints from the base classes training dataset 124 and/or the custom classes training dataset 125 that are at least in one aspect different from the sample datapoints selected at 402, and the processing 400 proceeds to 403.

If it is determined to not select the different sample datapoints (NO in 430), the processing 400 proceeds to 406 where the bound related to the performance of the target model on the custom classes may be changed, for example, lowered.

With reference to FIG. 4B, a part of a determination processing performed in 420 is depicted in more detail.

At 442, it is determined whether the intermediate target model version obtained as a result of a current iteration (or a current epoch) in operation 404 satisfies one or more first threshold(s) related to the performance of the target model on the base classes, e.g., whether one or more first threshold(s) related to the performance of the target model on the base classes are not less than the performance metric(s) determined for the intermediate target model version in operation 410. For example, the first threshold(s) may be value(s) determined empirically by the model training system 100. However, this is not intended to be limiting and, in some implementations, value(s) of the first threshold(s) may be provided by a customer, e.g., a customer of the CSP. As another example, the described-above base model metric(s) obtained for the trained base model and representing an upper bound on the base classes performance for the target model may be used as the value(s) of the first threshold(s).

If it is determined that the intermediate target model version obtained as a result of a current iteration (or a current epoch) satisfies one or more first threshold(s) related to the performance of the target model on the base classes (YES in 442), the processing 400 proceeds to 444. If it is determined that the intermediate target model version obtained as a result of a current iteration (or a current epoch) does not satisfy one or more first threshold(s) related to the performance of the target model on the base classes (NO in 442), the processing 400 proceeds to 424 and the operations are either terminated at 426 or the custom model is retrained to generate the target model, e.g., by proceeding to 430.

At 444, it is determined whether the intermediate target model version obtained as a result of a current iteration (or a current epoch) satisfies one or more second threshold(s) related to the performance of the target model on the custom classes, e.g., whether one or more second threshold(s) related to the performance of the target model on the custom classes are not less than the performance metric(s) determined for the intermediate target model version in operation 412. The second threshold(s) may correspond to the bound(s) described above with reference to operations 405 and 406 of FIG. 4A.

If it is determined that the intermediate target model version obtained as a result of a current iteration (or a current epoch) satisfies one or more second threshold(s) related to the performance of the target model on the custom classes (YES in 444), the processing 400 proceeds to 448. If it is determined that the intermediate target model version obtained as a result of a current iteration (or a current epoch) does not satisfy one or more second threshold(s) related to the performance of the target model on the custom classes (NO in 444), the processing 400 proceeds to 424 and the operations are either terminated at 426 or the custom model is retrained to generate the target model, e.g., by proceeding to 430.

At 448, it is determined whether the value(s) of the overall performance metric(s) determined for the intermediate target model version in operation 414 exceed the value(s) of the overall performance metric(s) of any the intermediate target model version obtained at previous iterations (or in one or more of previous epochs).

If it is determined that the value(s) of the overall performance metric(s) determined for the intermediate target model version obtained as a result of a current iteration (or a current epoch) do not exceed the value(s) of the overall performance metric(s) of any of the intermediate target model versions obtained at previous iterations (or in one or more of previous epochs) (NO in 448), the processing 400 proceeds to 424 and the operations are either terminated at 426 or the custom model is retrained to generate the target model, e.g., by proceeding to 430.

If, at 448, it is determined that the value(s) of the overall performance metric(s) determined for the intermediate target model version obtained as a result of a current iteration (or a current epoch) exceed the value(s) of the overall performance metric(s) of any intermediate target model version obtained at previous iterations (or previous epochs) (YES in 448), the processing 400 proceeds to 422.

At 422, the intermediate target model version is output as a final target model of which the performance metric(s) on the base classes is not less than the first threshold(s) configured for the performance of the target model on the base classes, the performance metric(s) on the custom classes is not less than the second threshold(s) configured for the performance of the target model on the custom classes, and the overall performance metric(s) are the best performance metric(s) on the mixed classes achieved as a result of the processing 400.

As described above, in some implementations, the retraining to generate the target model may proceed by lowering the bound on the custom classes performance in 406. For example, the operations of the processing 400 may be iterated by varying the bound on the custom classes performance (operation 406) until the desired balance between the base and custom classes performance is achieved.

Further, in some implementations, the retraining to generate the target model may proceed by reselecting sample datapoints from the base classes training dataset 124 and/or the custom classes training dataset 125 (operation 432).

Additionally, in some implementations, the retraining to generate the target model may proceed by reselecting sample datapoints from the base classes training dataset 124 and/or the custom classes training dataset 125 (operation 432) and by lowering the bound on the custom classes performance in 406.

The training performed by the target model generation subsystem 118 may be monitored based on determining the performance metric(s) for the base classes datapoints in 410, the performance metric(s) for the custom classes datapoints in 412, and the overall performance metric(s) in 414 at the end of every iteration or at the end of every epoch (e.g., after a certain number of iterations is performed). During the training process, the performance metric(s) for the custom classes datapoints is measured by applying the current (intermediate) target model version on the test split of the custom training dataset and comparing the predictions with the ground-truth labels of the test split. Similarly, the performance metric(s) for the base classes datapoints is measured on the test split of the base classes training dataset. The overall performance metric(s) are measured on the combined test split of base and custom classes training datasets.

In some implementations, the performance of the intermediate target model version may be considered satisfactory if the overall performance metric(s) of the intermediate target model version for the base classes is better than the previously obtained overall performance metric(s) and also the performance metric(s) of the intermediate target model version for the custom classes is not less than the bound related to the performance of the target model on the custom classes as determined by operation 405 and/or 406. Such intermediate target model version may correspond to the best performance on the base classes achieved so far while the performance on the custom classes is held to be not less than the acceptable bound determined by operation 405 and/or 406.

In some implementations, the training process described above with reference to the processing 400 may be further modified by dynamically changing the learning rate in favor of the custom classes. For example, as the performance metric(s) for the custom classes degrades and approaches toward the bound determined by operation 405 and/or 406 as the training progresses, the learning rate may be decreased to maintain the performance metric(s) for the custom classes at least at the bound determined by operation 405 and/or 406.

Another parameter to control the performance for the custom classes is the number of samples selected from base and custom classes training datasets for the training. If more samples are selected from the custom classes training dataset and fewer from the base classes training dataset, then the target model may perform better on the custom classes.

In some implementations, the target model may achieve better results as compared to the upper bound on the base classes, e.g., the base model metric(s) at the time when the training for the model to predict the bases classes was completed, and the upper bound on the custom classes, e.g., the custom model metric(s) output at 312. For example, training on the custom classes training dataset may improve the model's performance on the base classes.

FIG. 5 depicts a simplified block diagram of a portion of a model training system 100 according to certain embodiments.

With reference to FIG. 5, the user interface subsystem 136 may display a GUI 502. The GUI 502 may display a slide 504. The right side of the slide 504 represents a better performance on the custom classes and a left side of the slide 504 represents a better performance on the base classes, of the target model. The slide 504 may be used to select a trade-off between the base classes performance and the custom classes performance of the target model.

In some implementations, by manipulating the slide 504, the user may change a bound related to the performance of the target model on the custom classes. In an example illustrated in FIG. 5, the custom model metric(s) output in operation 312 of FIG. 3A or 3B may be 93% and may represent an upper bound on the custom classes performance. As described above with reference to operations 405 and 406 of FIG. 4A, the user may lower the upper bound on the custom classes performance by moving the slide 504 to the left side, toward the better performance on the base classes, such that the bound related to the performance of the target model on the custom classes may be lowered, e.g., to 90%, as illustrated in an example of FIG. 5.

However, the described-above is not intended to be limiting. In some implementations, the model training system 100 may perform adjustment of the bound without the user input and without using the GUI 502.

In some implementations, the GUI 502 may display, in an area 510, the upper bound on the custom classes metric(s). In some implementations, the GUI 502 may display, in an area 512, the upper bound on the base classes metric(s). In some implementations, the GUI 502 may display a UI 514 in an area 516. A user may input a numerical value of a bound related to the performance of the target model with respect to the custom classes. In an example of FIG. 5, the user may change the bound related to the performance of the target model with respect to the custom classes using the slide 504 or by entering a value in the UI 514.

Although not illustrated, the performance metric(s) of the intermediate target model version for the base classes datapoints, the performance metric(s) of the intermediate target model version for the custom classes datapoints, and/or the overall performance metric(s) of the intermediate target model version for the mixed classes that are determined in operation 408 of FIG. 4A may also be displayed on the GUI 502.

Figures 6, 7:
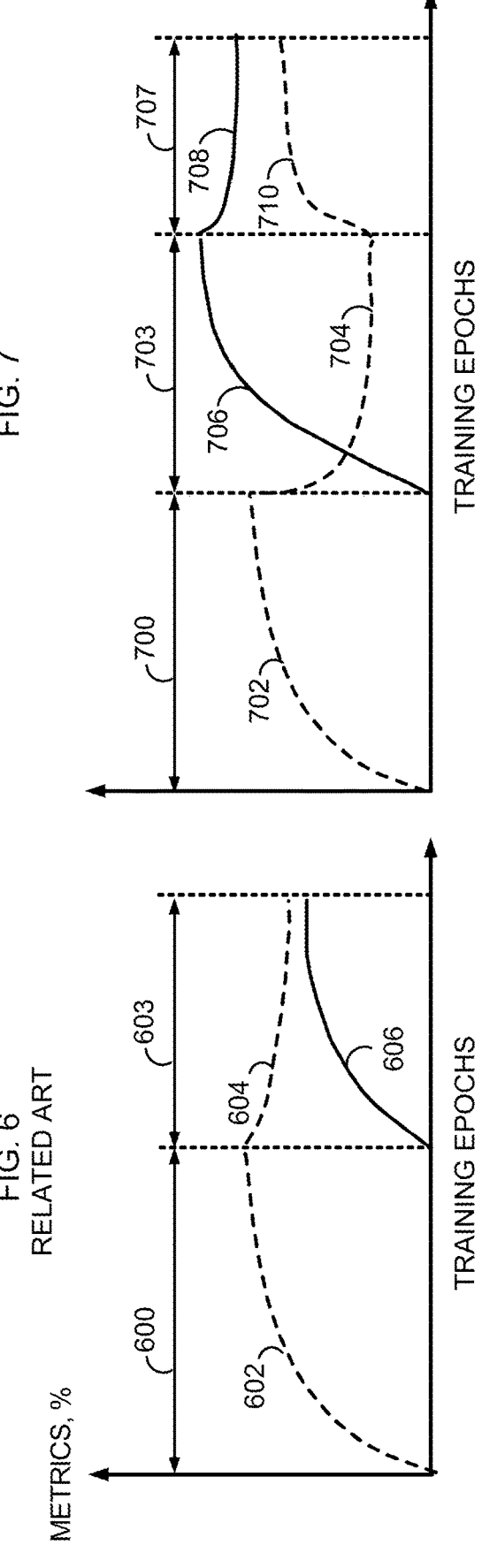
FIG. 6 depicts performance-related graphs according to the related art.
FIG. 7 depicts performance-related graphs according to certain embodiments.

FIG. 6 depicts performance-related graphs according to the related art, and FIG. 7 depicts performance-related graphs according to certain embodiments. In FIGS. 6 and 7, the x-axis represents the total training epochs, the y-axis represents the metric(s), the dotted curves correspond to the base model performance, and the solid curves correspond to the custom model performance.

With reference to FIG. 6, the training stage 600 corresponding to a curve 602 designates the training stage where the training for the base model to predict the base classes is performed. The training stage 603 corresponding to curves 604 and 606 designates the training stage of the related art where the continual learning training for the target model to predict the base classes and the custom classes is performed.

With reference to FIG. 7, the training stage 700 corresponding to a curve 702 designates the first training stage where the training for the base model to predict the base classes is performed.

The training stage 703 corresponding to curves 704 and 706 designates the second training stage where the custom model is generated by training the base model on the custom classes training dataset according to certain embodiments.

The training stage 707 corresponding to curves 708 and 710 designates the third training stage where the continual learning training on the custom model, to obtain the target model for predicting the base classes and the custom classes, is performed according to certain embodiments.

The training stage 700 of FIG. 7 corresponds to the training stage 600 of FIG. 6 and exhibits similar performance metric(s) with respect to the performance of the trained base model with respect to the base classes, as shown by the curve 702 and the curve 602, respectively.

In the training stage 603, according to the related art, the continual learning training is performed under the constraint to maintain the base classes metric(s) while trying to improve the custom classes metric(s) from zero value. The final custom classes metric(s) represented by the curve 606 that is achieved after the completion of the training stage 603 is suboptimal. The performance of the base model on the base classes drops during the training stage 603, but remains at an acceptable level, as shown by the curve 604.

On the other hand, the training stage 703 according to embodiments places emphasis on the custom classes and temporarily achieves the best possible custom classes metric(s) as shown by the curve 706, by iteratively improving the custom classes performance until the custom model performance reaches the preconfigured threshold(s), as described above. The training performed in the training stage 703 places less significance on the base classes performance, and the resulting model may undergo catastrophic forgetting of the base classes as shown by the curve 704.

In the training stage 707, as shown by the curve 710, the base classes performance is improved and the base classes metric(s) is recovered to a value closer to the original value achieved in the training stage 700, by sampling the base classes training dataset, while the custom classes metric(s) is maintained not less than the bound determined for the target model performance for the custom classes, as shown by the curve 708.

Accordingly, in embodiments, in the training stage 707, the base classes metric(s) approaches the base classes metric(s) of the training stage 700, while the best possible performance metric(s) for the custom classes is achieved.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
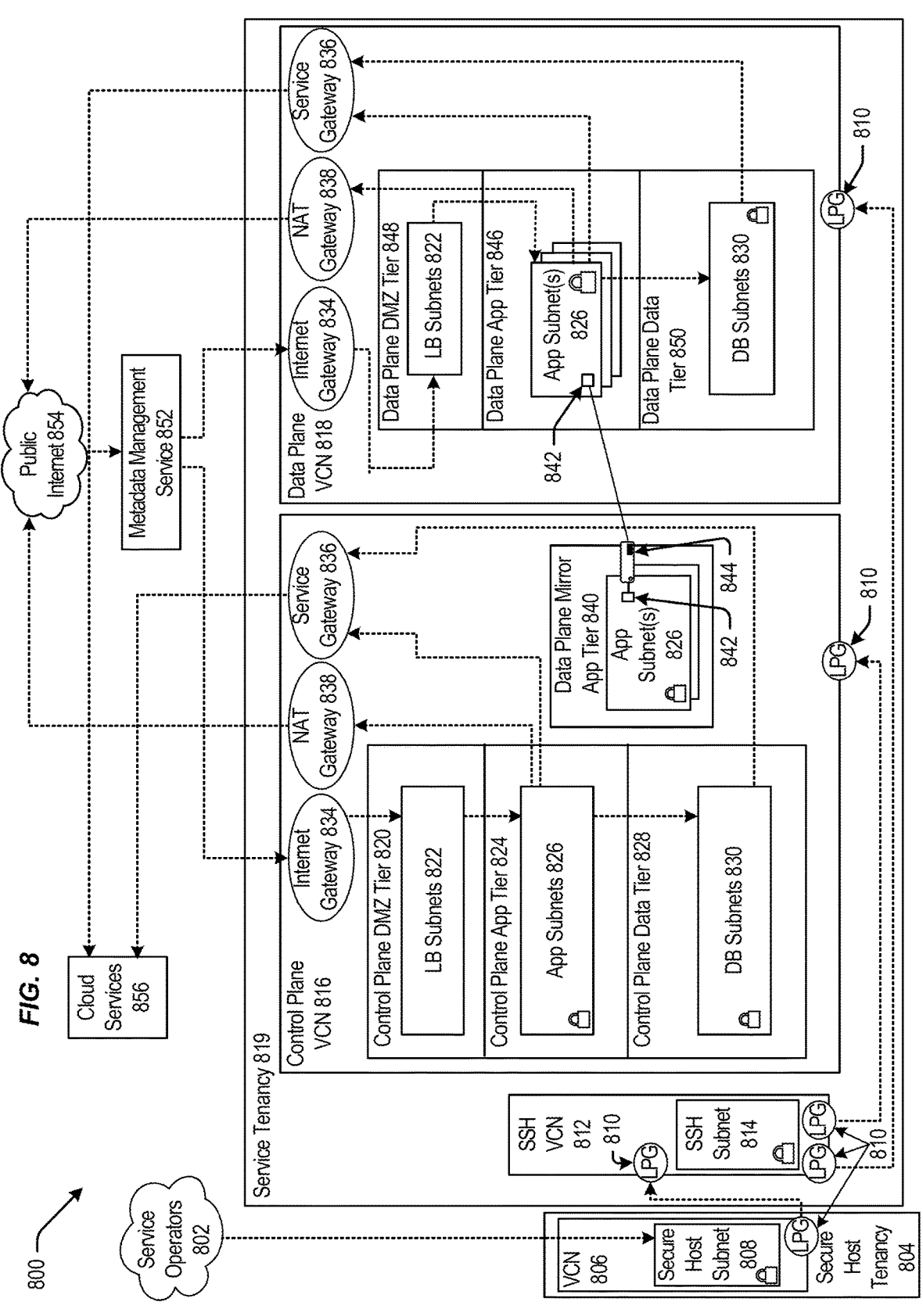
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
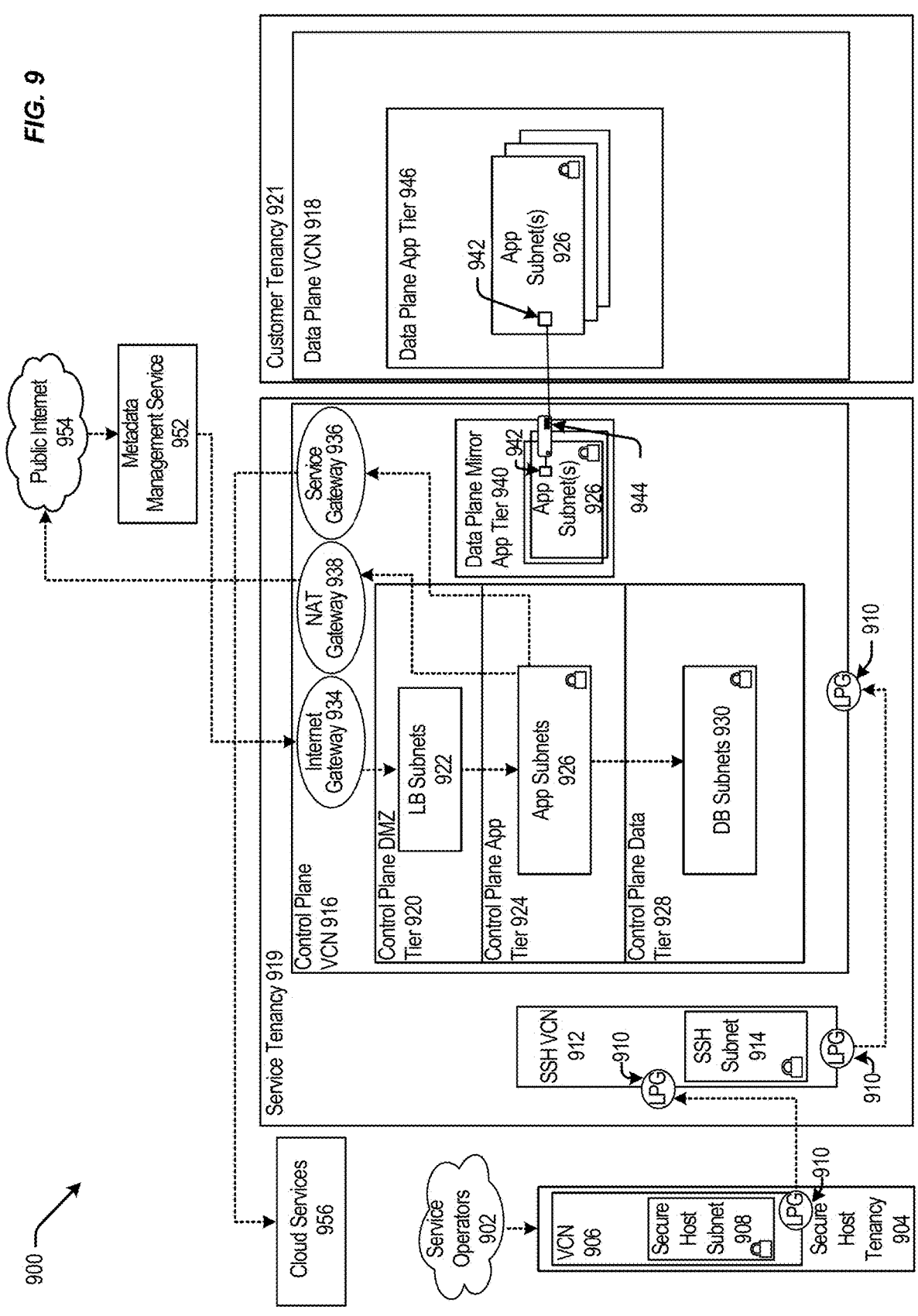
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
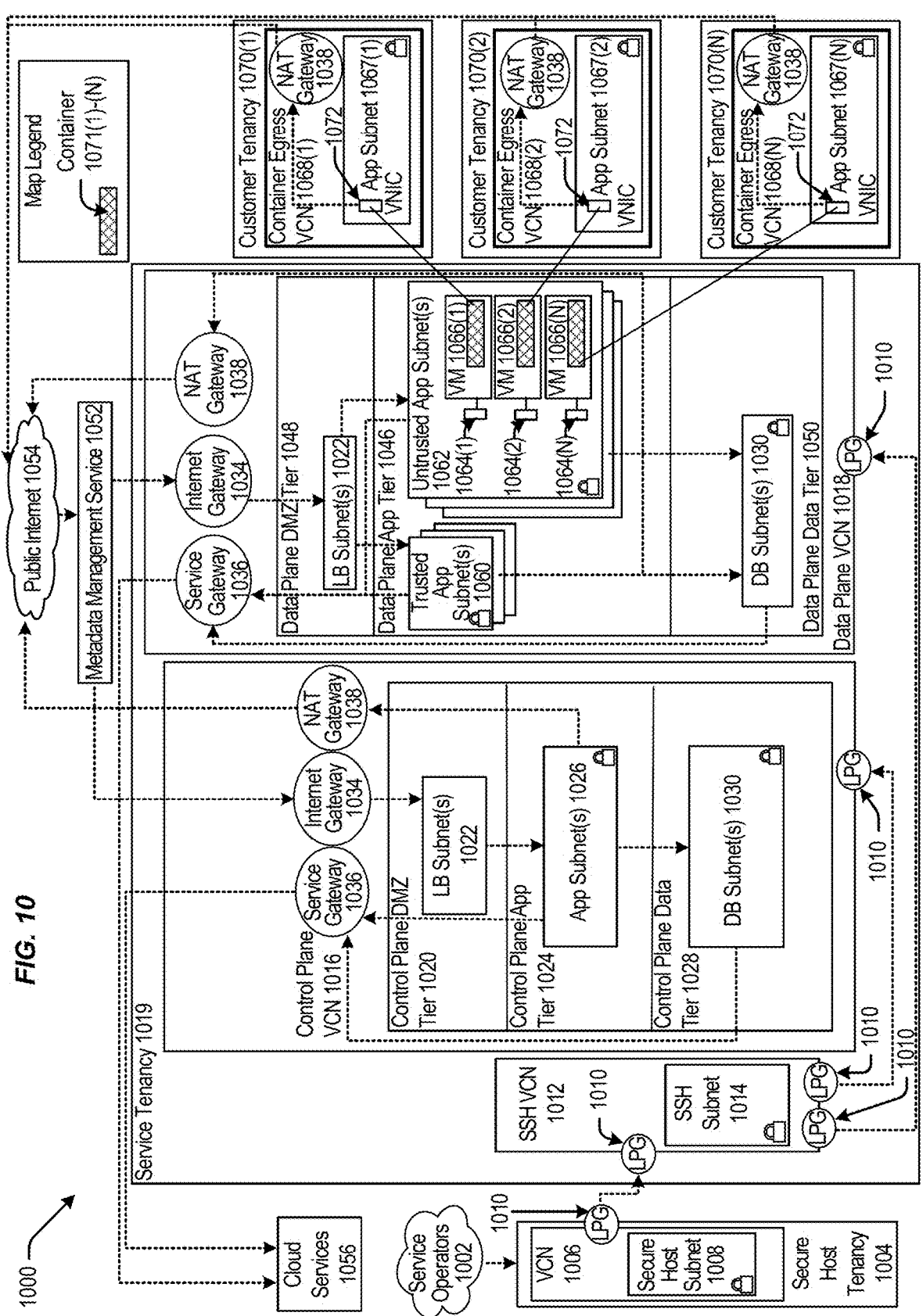
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
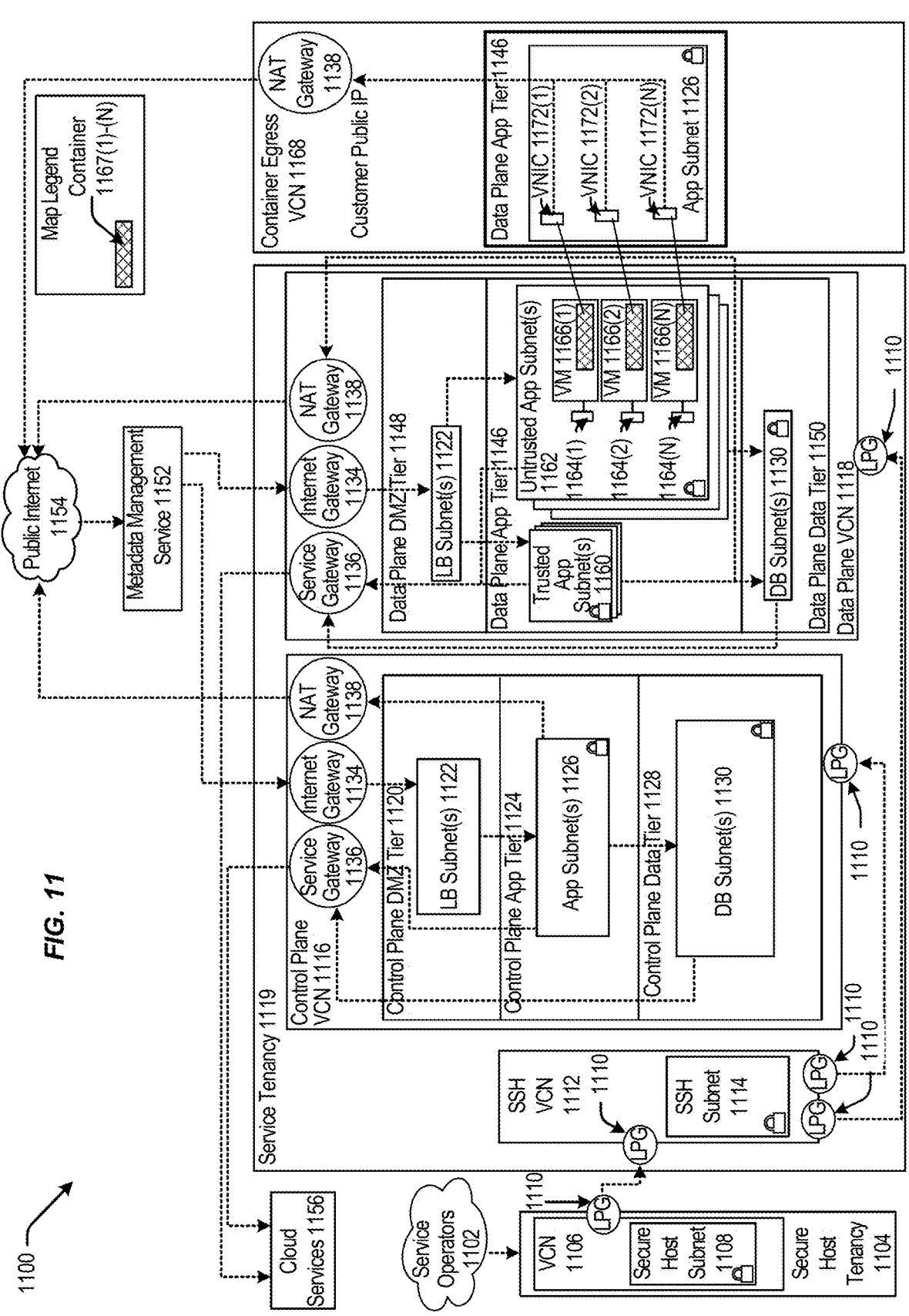
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
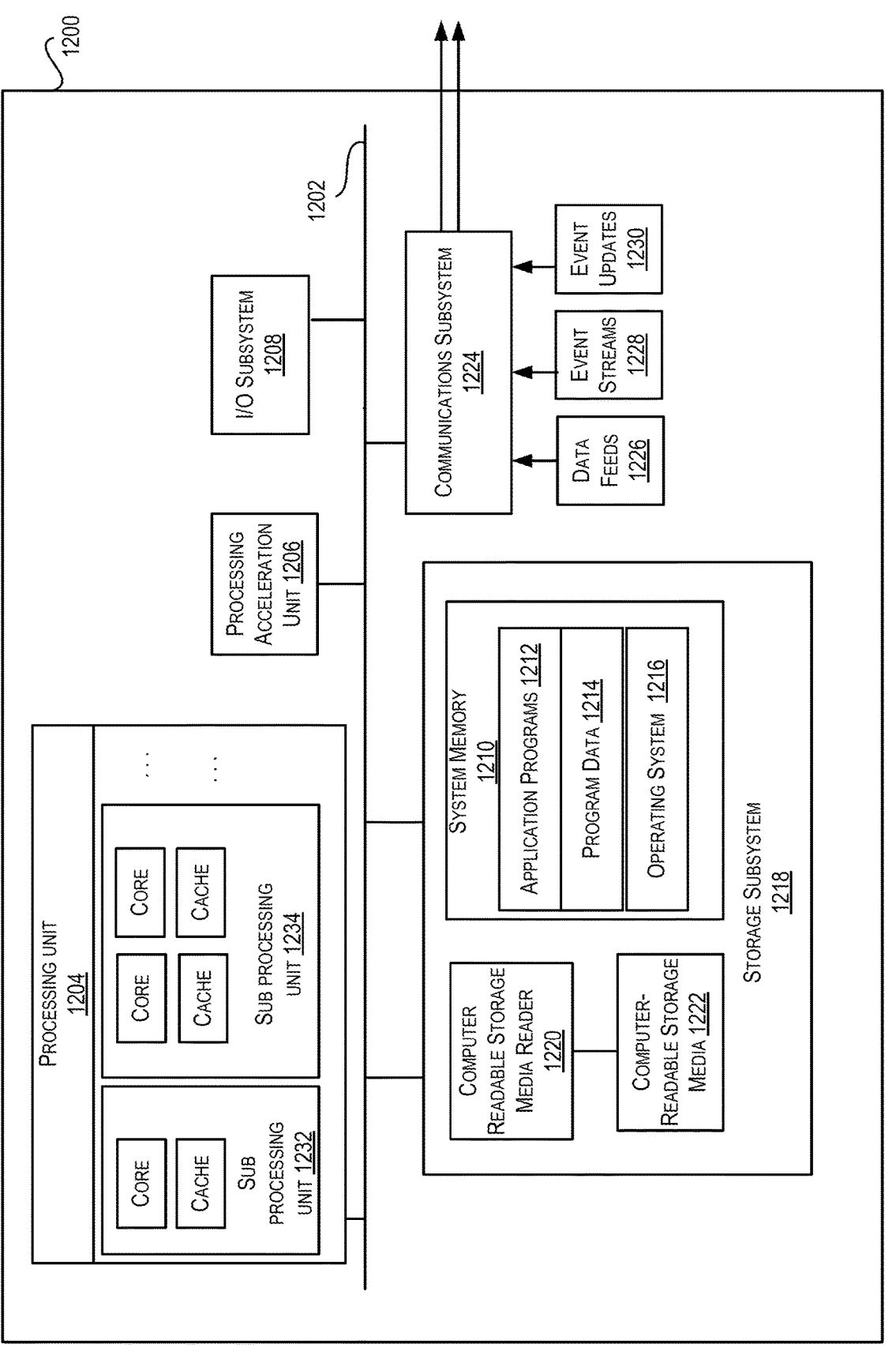
FIG. 12 is a block diagram illustrating an example com- puter system, according to at least one embodiment.

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and operations, it should be apparent to those skilled in the art that the scope of the present disclosure is not limited to the described series of transactions and operations. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

training, by a model training system, a model using a base classes training dataset comprising datapoints associated with a plurality of base classes, to generate a base model;

training, by the model training system, the base model to generate a custom model, the training the base model including:

(i) training the base model using a custom classes training dataset including training datapoints associated with a plurality of custom classes different from the plurality of base classes, to generate an intermediate custom model version, (ii) evaluating whether a performance metric of the intermediate custom model version for the plurality of custom classes meets a custom model related performance threshold, upon determining, based on the evaluating in (ii), that the performance metric does not meet the custom model related performance threshold, repeating (i) and (ii) until the performance metric of the intermediate custom model version meets the custom model related performance threshold, and in response to the performance metric of the intermediate custom model version meeting the custom model related performance threshold for the plurality of custom classes, designating the intermediate custom model version as the custom model; and training, by the model training system, the custom model to generate a target model, the training the custom model including:

(iii) training the custom model using a target model training dataset including a first plurality of datapoints from the base classes training dataset and a second plurality of datapoints from the custom classes training dataset, to generate an intermediate target model version, (iv) evaluating whether corresponding performance metrics of the intermediate target model version for the plurality of base classes and the plurality of custom classes meet respective target model related performance thresholds for the plurality of base classes and the plurality of custom classes, upon determining, based on the evaluating in (iv), that the performance metrics do not meet the target model related performance thresholds, repeating one or more of (iii) and (iv) until the performance metrics of the intermediate target model version meet the target model related performance thresholds, and in response to the performance metrics of the intermediate target model version meeting the target model related performance thresholds for the plurality of base classes and the plurality of custom classes, designating the intermediate target model version as the target model, wherein the target model is configured to, based on provided first input, make at least one prediction involving one or more classes from the plurality of base classes, and, based on provided second input, make at least one prediction involving one or more classes from the plurality of custom classes.

2. The method of claim 1, wherein the base model, the custom model, and the target model are neural network models.

3. The method of claim 1, wherein:

the training the base model using the custom classes training dataset in (i) further comprises (a) generating the intermediate custom model version by training the base model using one or more first datapoints selected from the training datapoints of the custom classes training dataset, the evaluating in (ii) further comprises:

(b) determining the performance metric for the intermediate custom model version using one or more second datapoints selected from the training datapoints of the custom classes training dataset, and (c) comparing the performance metric to the custom model related performance threshold, and the repeating (i) and (ii) further comprises, upon determining, based on the comparing in (c), that the performance metric does not meet the custom model related performance threshold, performing (d) which comprises:

(e) generating a subsequent intermediate custom model version by training the intermediate custom model version, which was previously generated, using the one or more first datapoints and additional first datapoints that are selected from the training datapoints of the custom classes training dataset, (f) determining a performance metric for the subsequent intermediate custom model version using one or more second datapoints selected from the training datapoints of the custom classes training dataset, and (g) comparing the performance metric for the subsequent intermediate custom model version to the custom model related performance threshold;

upon determining, based on the comparing in (g), that the performance metric meets the custom model related performance threshold, designating the subsequent intermediate custom model version as the custom model; and upon determining, based on the comparing in (g), that the performance metric does not meet the custom model related performance threshold, repeating (d) until determining that the performance metric for a particular subsequent intermediate custom version generated as a result of one of repetitions of (d) meets the custom model related performance threshold, and designating a particular subsequent intermediate custom model version as the custom model.

4. The method of claim 1, wherein:

the model training system is provided by a cloud services provider (CSP), the custom model related performance threshold is specified by a customer of the CSP, and the custom classes training dataset is provided by the customer.

5. The method of claim 1, wherein:

the training the custom model using the target model training dataset in (iii) further comprises (a) generating the intermediate target model version by training the custom model using one or more first datapoints selected from the target model training dataset, and the evaluating in (iv) further comprises:

(b) determining the performance metrics for the intermediate target model version using one or more second datapoints selected from the target model training dataset, and (c) comparing the performance metrics to the target model related performance thresholds.

6. The method of claim 1, wherein:

the target model related performance thresholds comprise a first threshold related to a performance of the target model for the plurality of base classes and a second threshold related to a performance of the target model for the plurality of custom classes, the model training system is provided by a cloud services provider (CSP), at least one from among the first threshold and the second threshold is specified by a customer of the CSP, and the custom classes training dataset is provided by the customer.

7. The method of claim 1, wherein the training the custom model to generate the target model further comprises:

prior to the evaluating in (iv), receiving a first threshold related to a performance of the target model with respect to the plurality of base classes among the target model related performance thresholds, and a second threshold related to a performance of the target model with respect to the plurality of custom classes among the target model related performance thresholds.

8. The method of claim 7, wherein the receiving further comprises:

receiving at least one from among the first threshold and the second threshold through a user interface subsystem of the model training system.

9. The method of claim 7, wherein;

the training the custom model using the target model training dataset in (iii) further comprises (a) generating the intermediate target model version of a current epoch by training the custom model using one or more first datapoints among the first plurality of datapoints and one or more first datapoints among the second plurality of datapoints, the evaluating in (iv) further comprises:

(b) determining, for the intermediate target model version, a first performance metric, among the performance metrics, for base classes datapoints using one or more second datapoints among the first plurality of datapoints, (c) determining, for the intermediate target model version, a second performance metric, among the performance metrics, for custom classes datapoints using one or more second datapoints among the second plurality of datapoints, (d) determining, for the intermediate target model version, an overall performance metric for mixed classes datapoints including at least one datapoint selected from the first plurality of datapoints and at least one datapoint selected from the second plurality of datapoints, (e) comparing the first performance metric to the first threshold, the second performance metric to the second threshold, and the overall performance metric to a previously determined overall performance metric which was determined for a previously generated intermediate target model version generated in a previous epoch; and (f) based on the comparing in (e), determining whether at least one condition from among conditions including the first performance metric being not less than the first threshold, the second performance metric being not less than the second threshold, and the overall performance metric exceeding the previously determined overall performance metric is not satisfied;

the repeating the one or more (iii) and (iv) further comprises, upon the determining that the at least one condition is not satisfied, repeating one or more of (a), (b), (c), (d), (e), and (f); and upon the determining that the conditions including the first performance metric being not less than the first threshold, the second performance metric being not less than the second threshold, and the overall performance metric exceeding the previously determined overall performance metric are satisfied, designating the intermediate target model version of the current epoch as the target model.

10. The method of claim 9, further comprising determining that the at least one condition is not satisfied, wherein:

the second threshold has a first value, and the repeating the one or more of (a), (b), (c), (d), (e), and (f) comprises:

receiving a second value for the second threshold that is lower than the first value, the second threshold being related to the performance of the target model with respect to the plurality of custom classes; and repeating at least (e) and (f) using the second value for the second threshold.

11. The method of claim 10, wherein the receiving the second value for the second threshold further comprises receiving the second value for the second threshold through a user interface subsystem of the model training system.

12. The method of claim 9, further comprising determining that the at least one condition is not satisfied, wherein the repeating the one or more of (a), (b), (c), (d), (e), and (f) comprises:

repeating (a), by modifying at least one from among a set comprising the one or more first datapoints among the first plurality of datapoints and a set comprising the one or more first datapoints among the second plurality of datapoints; and subsequently repeating (b), (c), (d), (e), and (f).

13. The method of claim 12, further comprising determining that the at least one condition is not satisfied by determining that the first performance metric is less than the first threshold or the second performance metric is less than the second threshold, wherein the repeating (a) further comprises:

adding more datapoints corresponding to the plurality of base classes to the set comprising the one or more first datapoints among the first plurality of datapoints if the first performance metric is less than the first threshold, or adding more training datapoints corresponding to the plurality of custom classes to the set comprising the one or more first datapoints among the second plurality of datapoints if the second performance metric is less than the second threshold.

14. The method of claim 9, further comprising determining that the at least one condition is not satisfied, wherein the repeating the one or more of (a), (b), (c), (d), (e), and (f) comprises:

determining a first difference between a value associated with the first performance metric for the base classes datapoints and the first threshold;

determining a second difference between a value associated with the second performance metric for the custom classes datapoints and the second threshold;

based on the first difference and the second difference, determining whether a performance of the intermediate target model version is better for the base classes datapoints or the custom classes datapoints, wherein the performance of the intermediate target model version is better for the custom classes datapoints if the first difference exceeds the second difference, and the performance of the intermediate target model version is better for the base classes datapoints if the second difference exceeds the first difference;

repeating (a) by performing one from among adding more datapoints to the one or more first datapoints of the second plurality of datapoints, upon determining that the performance of the intermediate target model version is better for the base classes datapoints, and adding more datapoints to the one or more first datapoints of the first plurality of datapoints, upon determining that the performance of the intermediate target model version is better for the custom classes datapoints; and subsequently repeating (b), (c), (d), (e), and (f).

15. A non-transitory computer-readable medium storing computer-executable instructions that, when executed by one or more computer systems of a model training system, cause the model training system to perform a method including:

training a model using a base classes training dataset comprising datapoints associated with a plurality of base classes, to generate a base model;

training the base model to generate a custom model, the training the base model including:

(i) training the base model using a custom classes training dataset including training datapoints associated with a plurality of custom classes different from the plurality of base classes, to generate an intermediate custom model version, (ii) evaluating whether a performance metric of the intermediate custom model version for the plurality of custom classes meets a custom model related performance threshold, upon determining, based on the evaluating in (ii), that the performance metric does not meet the custom model related performance threshold, repeating (i) and (ii) until the performance metric of the intermediate custom model version meets the custom model related performance threshold, and in response to the performance metrics of the intermediate custom model version meeting the custom model related performance threshold for the plurality of custom classes, designating the intermediate custom model version as the custom model; and training the custom model to generate a target model, the training the custom model including:

(iii) training the custom model using a target model training dataset including a first plurality of datapoints from the base classes training dataset and a second plurality of datapoints from the custom classes training dataset, to generate an intermediate target model version, (iv) evaluating whether corresponding performance metrics of the intermediate target model version for the plurality of base classes and the plurality of custom classes meet respective target model related performance thresholds for the plurality of base classes and the plurality of custom classes, upon determining, based on the evaluating in (iv), that the performance metrics do not meet the target model related performance thresholds, repeating one or more of (iii) and (iv) until the performance metrics of the intermediate target model version meet the target model related performance thresholds, and in response to the performance metrics of the intermediate target model version meeting the target model related performance thresholds for the plurality of base classes and the plurality of custom classes, designating the intermediate target model version as the target model, wherein the target model is configured to, based on provided first input, make at least one prediction involving one or more classes from the plurality of base classes, and, based on provided second input, make at least one prediction involving one or more classes from the plurality of custom classes.

16. The non-transitory computer-readable medium of claim 15, wherein:

the training the base model using the custom classes training dataset in (i) further includes (a) generating the intermediate custom model version by training the base model using one or more first datapoints selected from the training datapoints of the custom classes training dataset, the evaluating in (ii) further includes:

(b) determining the performance metric for the intermediate custom model version using one or more second datapoints selected from the training datapoints of the custom classes training dataset, and (c) comparing the performance metric to the custom model related performance threshold, and the repeating (i) and (ii) further includes, upon determining, based on the comparing in (c), that the performance metric does not meet the custom model related performance threshold, performing (d) which includes:

(e) generating a subsequent intermediate custom model version by training the intermediate custom model version, which was previously generated, using the one or more first datapoints and additional first datapoints that are selected from the training datapoints of the custom classes training dataset, (f) determining a performance metric for the subsequent intermediate custom model version using one or more second datapoints selected from the training datapoints of the custom classes training dataset, and (g) comparing the performance metric for the subsequent intermediate custom model version to the custom model related performance threshold;

upon determining, based on the comparing in (g), that the performance metric meets the custom model related performance threshold, designating the subsequent intermediate custom model version as the custom model; and upon determining, based on the comparing in (g), that the performance metric does not meet the custom model related performance threshold, repeating (d) until determining that the performance metric for a particular subsequent intermediate custom version generated as a result of one of repetitions of (d) meets the custom model related performance threshold, and designating a particular subsequent intermediate custom model version as the custom model, wherein:

the training the custom model using the target model training dataset in (iii) further includes (h) generating the intermediate target model version by training the custom model using one or more first datapoints selected from the target model training dataset, the evaluating in (iv) further includes:

(j) determining the performance metrics for the intermediate target model version using one or more second datapoints selected from the target model training dataset, and (k) comparing the performance metrics to the target model related performance thresholds, and the repeating of the one or more of (iii) and (iv) further includes, based on the comparing in (k), that a performance metric does not meet the target model related performance thresholds, repeating one or more of (h), (j), and (k) until the performance metrics of the intermediate target model version meet the target model related performance thresholds.

17. The non-transitory computer-readable medium of claim 15, wherein the training the custom model to generate the target model further includes:

prior to the evaluating in (iv), receiving a first threshold related to a performance of the target model with respect to the plurality of base classes among the target model related performance thresholds, and a second threshold related to a performance of the target model with respect to the plurality of custom classes among the target model related performance thresholds, and wherein at least one from among the first threshold and the second threshold is received through a user interface subsystem of the model training system.

18. A system comprising:

one or more computer systems configured to perform a method including:

training a model using a base classes training dataset comprising datapoints associated with a plurality of base classes, to generate a base model;

training the base model to generate a custom model, the training the base model including:

(i) training the base model using a custom classes training dataset including training datapoints associated with a plurality of custom classes different from the plurality of base classes, to generate an intermediate custom model version, (ii) evaluating whether a performance metric of the intermediate custom model version for the plurality of custom classes meets a custom model related performance threshold, upon determining, based on the evaluating in (ii), that the performance metric does not meet the custom model related performance threshold, repeating (i) and (ii) until the performance metric of the intermediate custom model version meets the custom model related performance threshold, and in response to the performance metrics of the intermediate custom model version meeting the custom model related performance threshold for the plurality of custom classes, designating the intermediate custom model version as the custom model; and training the custom model to generate a target model, the training the custom model including:

(iii) training the custom model using a target model training dataset including a first plurality of datapoints from the base classes training dataset and a second plurality of datapoints from the custom classes training dataset, to generate an intermediate target model version, (iv) evaluating whether corresponding performance metrics of the intermediate target model version for the plurality of base classes and the plurality of custom classes meet respective target model related performance thresholds for the plurality of base classes and the plurality of custom classes, upon determining, based on the evaluating in (iv), that the performance metrics do not meet the target model related performance thresholds, repeating one or more of (iii) and (iv) until the performance metrics of the intermediate target model version meet the target model related performance thresholds, and in response to the performance metrics of the intermediate target model version meeting the target model related performance thresholds for the plurality of base classes and the plurality of custom classes, designating the intermediate target model version as the target model, wherein the target model is configured to, based on provided first input, make at least one prediction involving one or more classes from the plurality of base classes, and, based on provided second input, make at least one prediction involving one or more classes from the plurality of custom classes.

19. The system of claim 18, wherein:

the training the base model using the custom classes training dataset in (i) further includes (a) generating the intermediate custom model version by training the base model using one or more first datapoints selected from the training datapoints of the custom classes training dataset, the evaluating in (ii) further includes:

(b) determining the performance metric for the intermediate custom model version using one or more second datapoints selected from the training datapoints of the custom classes training dataset, and (c) comparing the performance metric to the custom model related performance threshold, and the repeating (i) and (ii) further includes, upon determining, based on the comparing in (c), that the performance metric does not meet the custom model related performance threshold, performing (d) which includes:

(e) generating a subsequent intermediate custom model version by training the intermediate custom model version, which was previously generated, using the one or more first datapoints and additional first datapoints that are selected from the training datapoints of the custom classes training dataset, (f) determining a performance metric for the subsequent intermediate custom model version using one or more second datapoints selected from the training datapoints of the custom classes training dataset, and (g) comparing the performance metric for the subsequent intermediate custom model version to the custom model related performance threshold;

upon determining, based on the comparing in (g), that the performance metric meets the custom model related performance threshold, designating the subsequent intermediate custom model version as the custom model; and upon determining, based on the comparing in (g), that the performance metric does not meet the custom model related performance threshold, repeating (d) until determining that the performance metric for a particular subsequent intermediate custom version generated as a result of one of repetitions of (d) meets the custom model related performance threshold, and designating a particular subsequent intermediate custom model version as the custom model, wherein the training the custom model using the target model training dataset in (iii) further includes (h) generating the intermediate target model version by training the custom model using one or more first datapoints selected from the target model training dataset, the evaluating in (iv) further includes:

(j) determining the performance metrics for the intermediate target model version using one or more second datapoints selected from the target model training dataset, and (k) comparing the performance metrics to the target model related performance thresholds, and the repeating of the one or more of (iii) and (iv) further includes, based on the comparing in (k), that a performance metric does not meet the target model related performance thresholds, repeating one or more of (h), (j), and (k) until the performance metrics of the intermediate target model version meet the target model related performance thresholds.

20. The system of claim 18, wherein the training the custom model to generate the target model further includes:

prior to the evaluating in (iv), receiving a first threshold related to a performance of the target model with respect to the plurality of base classes among the target model related performance thresholds, and a second threshold related to a performance of the target model with respect to the plurality of custom classes among the target model related performance thresholds, and wherein at least one from among the first threshold and the second threshold is received through a user interface subsystem of the system.

* * * * *